United States Patent
Maamari et al.

(10) Patent No.: US 12,446,051 B2
(45) Date of Patent: Oct. 14, 2025

(54) SINGLE DCI SCHEDULING MULTI-CARRIER FOR MULTI-SLOT PXSCHS AND MULTI-SPS/CG PDSCH

(71) Applicant: QUALCOMM Incorporated, San Diego, CA (US)

(72) Inventors: Diana Maamari, San Diego, CA (US); Ahmed Elshafie, San Diego, CA (US); Wei Yang, San Diego, CA (US); Kazuki Takeda, Minato-ku (JP); Huilin Xu, Temecula, CA (US); Prashanth Haridas Hande, San Diego, CA (US); Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/056,685

(22) Filed: Nov. 17, 2022

(65) Prior Publication Data
US 2024/0172240 A1    May 23, 2024

(51) Int. Cl.
    *H04W 72/12*    (2023.01)
    *H04L 5/00*     (2006.01)
    *H04W 72/23*    (2023.01)

(52) U.S. Cl.
    CPC .............. *H04W 72/23* (2023.01); *H04L 5/001* (2013.01)

(58) Field of Classification Search
    CPC ..... H04L 5/001; H04L 5/0044; H04L 5/0053; H04L 5/0094; H04W 72/23
    USPC ......................................................... 370/329
    See application file for complete search history.

(56) References Cited

U.S. PATENT DOCUMENTS

| | | | |
|---|---|---|---|
| 12,231,928 B2* | 2/2025 | Taherzadeh Boroujeni | H04W 72/23 |
| 2021/0045149 A1* | 2/2021 | Davydov | H04L 5/0023 |
| 2021/0266943 A1* | 8/2021 | Khoshnevisan | H04W 72/535 |
| 2021/0410120 A1* | 12/2021 | Takeda | H04W 72/0453 |
| 2023/0155747 A1* | 5/2023 | Choi | H04W 72/23 370/329 |
| 2023/0217458 A1* | 7/2023 | Bang | H04W 48/12 370/329 |
| 2023/0319614 A1* | 10/2023 | Takeda | H04W 72/1268 370/252 |
| 2024/0106606 A1* | 3/2024 | He | H04L 5/0053 |
| 2024/0147461 A1* | 5/2024 | Zhu | H04L 5/0053 |

(Continued)

*Primary Examiner* — Robert J Lopata
(74) *Attorney, Agent, or Firm* — Procopio, Cory, Hargreaves & Savitch

(57) ABSTRACT

Apparatuses and methods for single DCI scheduling multi-carrier for multi-slot PXSCHS and multi-SPS/CG PDSCH are described. An apparatus is configured to receive a configuration via RRC signaling, a MAC-CE, or DCI. The configuration is associated with a schedule of a set of CCs including at least two CCs. Each CC of the at least two CCs includes at least two PDSCHs or PUSCHs. The apparatus is also configured to communicate, via the set of CCs, with a network node based on the schedule. Another apparatus is configured to transmit a configuration via RRC signaling, a MAC-CE, or DCI. The configuration is associated with a schedule of a set of CCs including at least two CCs. Each CC of the at least two CCs includes at least two PDSCHs or PUSCHs. The other apparatus is also configured to communicate, via the set of CCs, with a UE based on the schedule.

10 Claims, 15 Drawing Sheets

(56) References Cited

U.S. PATENT DOCUMENTS

2024/0204931 A1* 6/2024 Xiong .................. H04L 5/0053
2024/0243855 A1* 7/2024 Bhamri ................ H04L 1/1861

* cited by examiner

SINGLE DCI SCHEDULING MULTI-CARRIER FOR MULTI-SLOT PXSCHS AND MULTI-SPS/CG PDSCH

TECHNICAL FIELD

The present disclosure relates generally to communication systems, and more particularly, to wireless communications utilizing downlink control information (DCI) for scheduling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to receive a configuration via first radio resource control (RRC) signaling, a medium access control (MAC) control element (MAC-CE), or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The apparatus is also configured to communicate, via the set of CCs, with a network node based on the schedule of the set of CCs.

In the aspect, the method includes receiving a configuration via first radio resource control (RRC) signaling, a medium access control (MAC) control element (MAC-CE), or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The method also includes communicating, via the set of CCs, with a network node based on the schedule of the set of CCs.

In another aspect of the disclosure, a method, a computer-readable medium, and an apparatus are provided. The apparatus is configured to transmit, for a user equipment (UE), a configuration via first radio resource control (RRC) signaling, a medium access control (MAC) control element (MAC-CE), or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The apparatus is also configured to communicate, via the set of CCs, with the UE based on the schedule of the set of CCs.

In the aspect, the method includes transmitting, for a user equipment (UE), a configuration via first radio resource control (RRC) signaling or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The method also includes communicating, via the set of CCs, with the UE based on the schedule of the set of CCs.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
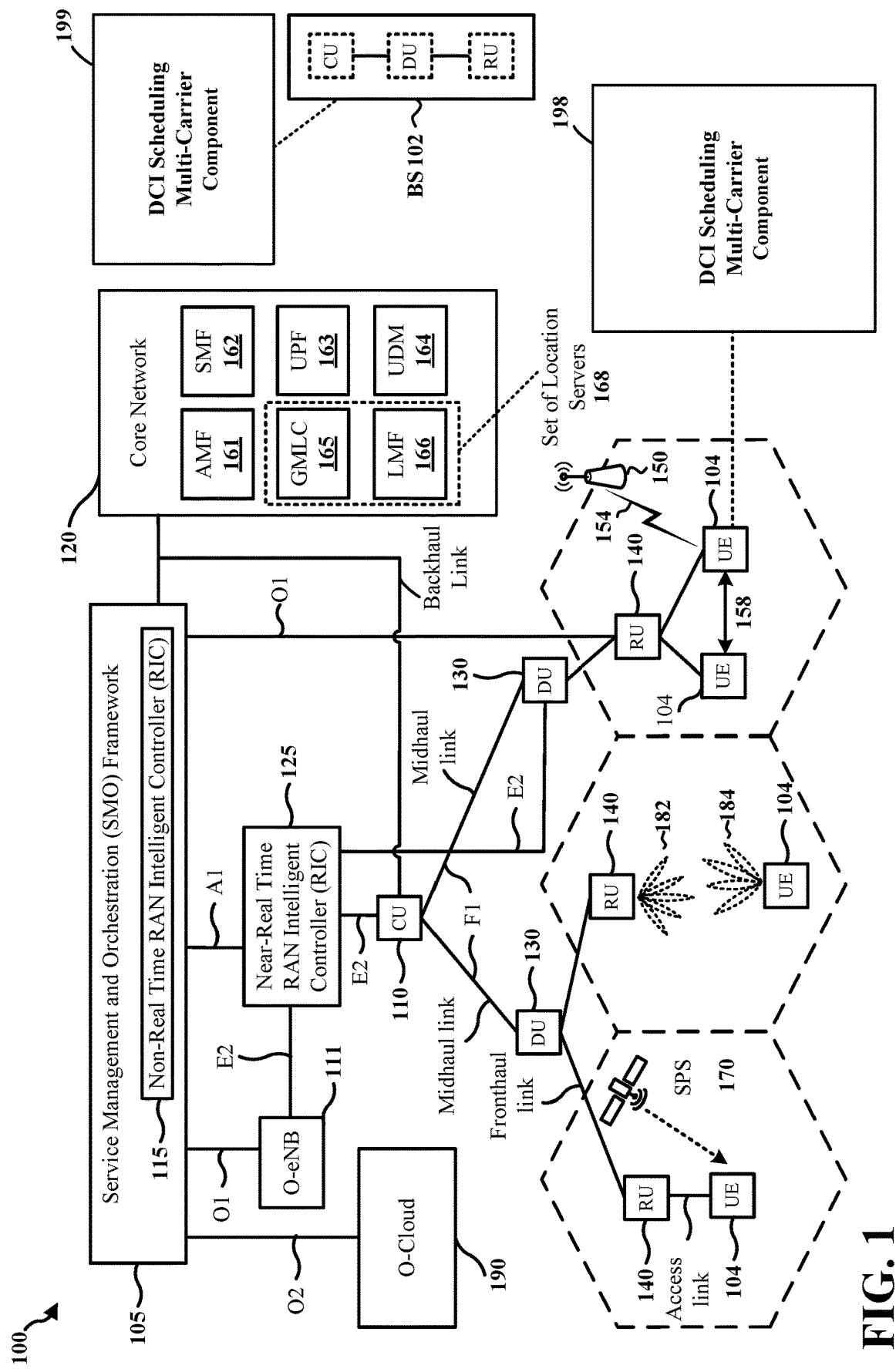
FIG. 1 is a diagram illustrating an example of a wireless communications system and an access network.

Some wireless communications may include traffic with large payloads and short deadlines that benefits from low latency. As an example, extended reality (XR) traffic may have short timeframes for exchange, as well as high data-rate flows such as video. Existing wireless networks lack the ability to schedule multiple PUSCHs/PDSCHs (PXSCHs) per a single scheduling DCI and provide a single PUSCH/PDSCH scheduling per single scheduling DCI. Additionally, scheduling of a single SPS/CG by a single DCI is supported by existing networks, but not multiple SPS/CG opportunities via a single DCI. Aspects presented herein provide improvements via a multi-slot PXSCH scheduling with a single DCI and multi-SPS/CG at a time over multiple carriers via a single DCI, and also improve communication delay for sensitive traffic and power usage at the UE- and the network-side.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DCI scheduling multi-carrier component 198 ("component 198") that is configured to receive a configuration via first radio resource control (RRC) signaling, a medium access control (MAC) control element (MAC-CE), or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The component 198 is also configured to communicate, via the set of CCs, with a network node based on the schedule of the set of CCs. In one aspect, the component 198 may be configured to receive, via second RRC signaling prior to the configuration via the DCI, a scheduling parameter configuration of the one or more scheduling fields for the set of CCs, where the scheduling parameter configuration includes indices associated with the sets of scheduling fields, and where the sets of scheduling fields each include configured values of scheduling parameters associated with at least one of a time domain resource assignment (TDRA) field, a frequency domain resource assignment (FDRA) field, a modulation coding scheme (MCS) field, or the priority field. In one aspect, the component 198 may be configured to receive the configuration via first DCI and second DCI, where the first DCI is associated with the second indication that the additional DCI includes the differential information for the scheduling fields associated with the at least one CC in the set of CCs, and where the additional DCI is the second DCI and includes the differential information. In one aspect, the component 198 may be configured to receive, via fourth RRC signaling from the network node, a second configuration that indicates a mapping between indices of the respective activated or deactivated CGs or SPSs on different bandwidth parts (BWPs) of the at least two CCs, where a first index of the indices in a first CC of the at least two CCs correspond to the mapping for a second index of a second CC of the at least two CCs. In one aspect, where each CC of the at least two CCs includes the at least two PDSCHs, the component 198 may be configured to transmit, via a CC of the at least two CCs and to the network node, hybrid automatic repeat request (HARD) acknowledgement (HARQ-ACK) feedback for the at least two PDSCHs, and where to receive the DCI the at least one processor is configured to receive the DCI via the CC of the at least two CCs, or to transmit, via each of the at least two CCs and to the network node, respective semi-persistent scheduling (SPS) feedback for the at least two PDSCHs. In certain aspects, the base station 102 may include a DCI scheduling multi-carrier component 199 ("component 199") that is configured to transmit, for a user equipment (UE), a configuration via first radio resource control (RRC) signaling or downlink control information (DCI), where the configuration is associated with a schedule of a set of component carriers (CCs) including at least two CCs, where each CC of the at least two CCs includes at least two physical downlink shared channels (PDSCHs) or at least two physical uplink shared channels (PUSCHs). The component 199 is also configured to communicate, via the set of CCs, with the UE based on the schedule of the set of CCs. In one aspect, where the DCI includes separate activation fields or deactivation fields for activation or deactivation of respective CGs or SPSs of a PUSCH or a PDSCH on an occasion of each of the respective CGs or SPSs over the at least two CCs, the component 198 may be configured to transmit, via second RRC signaling, a second configuration that indicates a mapping between indices of the respective activated or deactivated CGs or SPSs on different bandwidth parts (BWPs) of the at least two CCs, where a first index of the indices in a first CC of the at least two CCs correspond to the mapping for a second index of a second CC of the at least two CCs. Although the following description may be provided in the context of 5G NR and XR, the concepts described herein may be applicable to other similar areas and uses, such as LTE, LTE-A, CDMA, GSM, and other wireless technologies, as well as other applications for large video payloads and/or scheduling of multiple PUSCHs/PDSCHs per a scheduling DCI.

Figure 2:
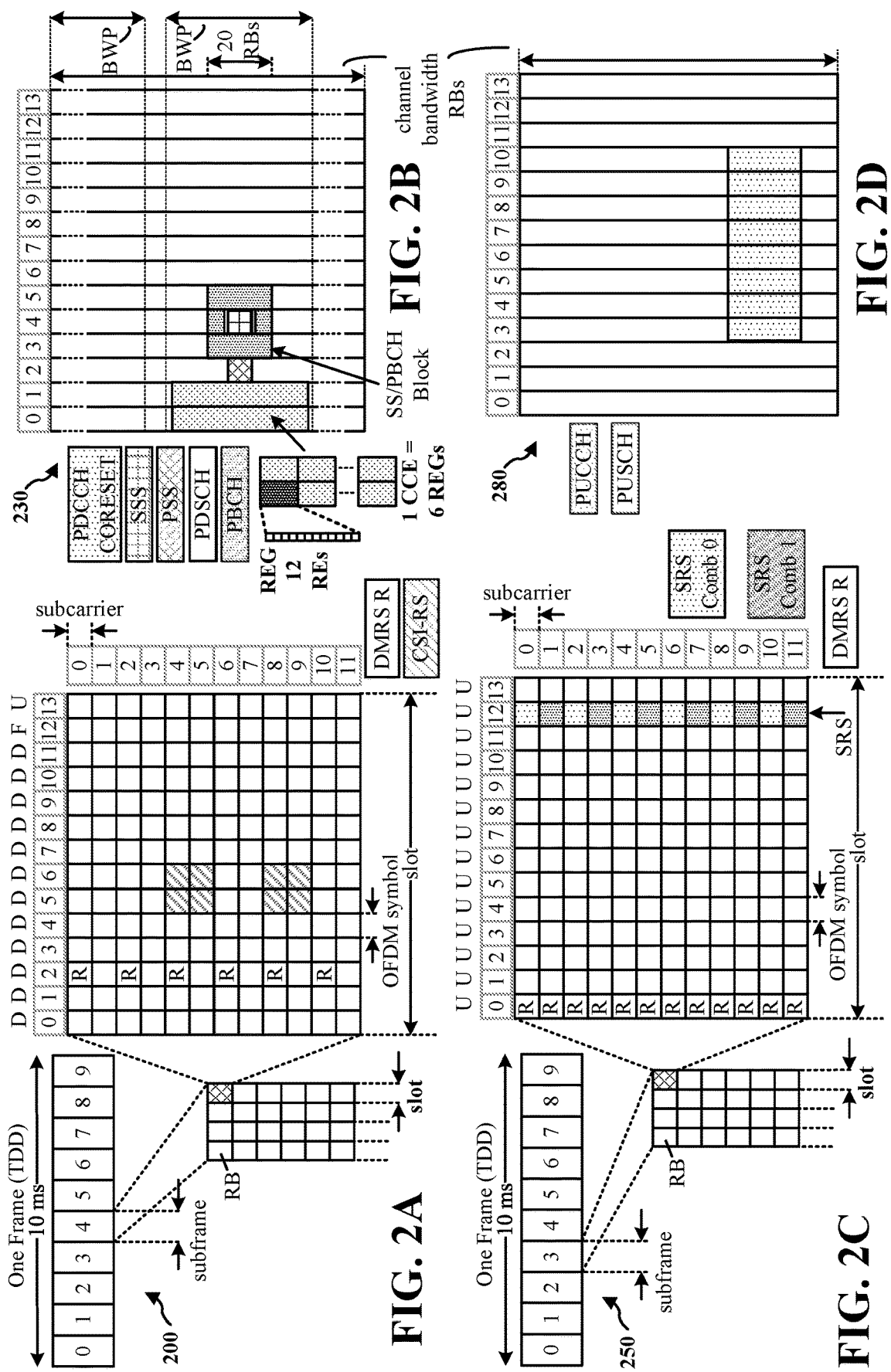
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |

TABLE 1-continued

Numerology, SCS, and CP

| μ | SCS<br>$\Delta f = 2^\mu \cdot 15$[kHz] | Cyclic prefix |
|---|---|---|
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
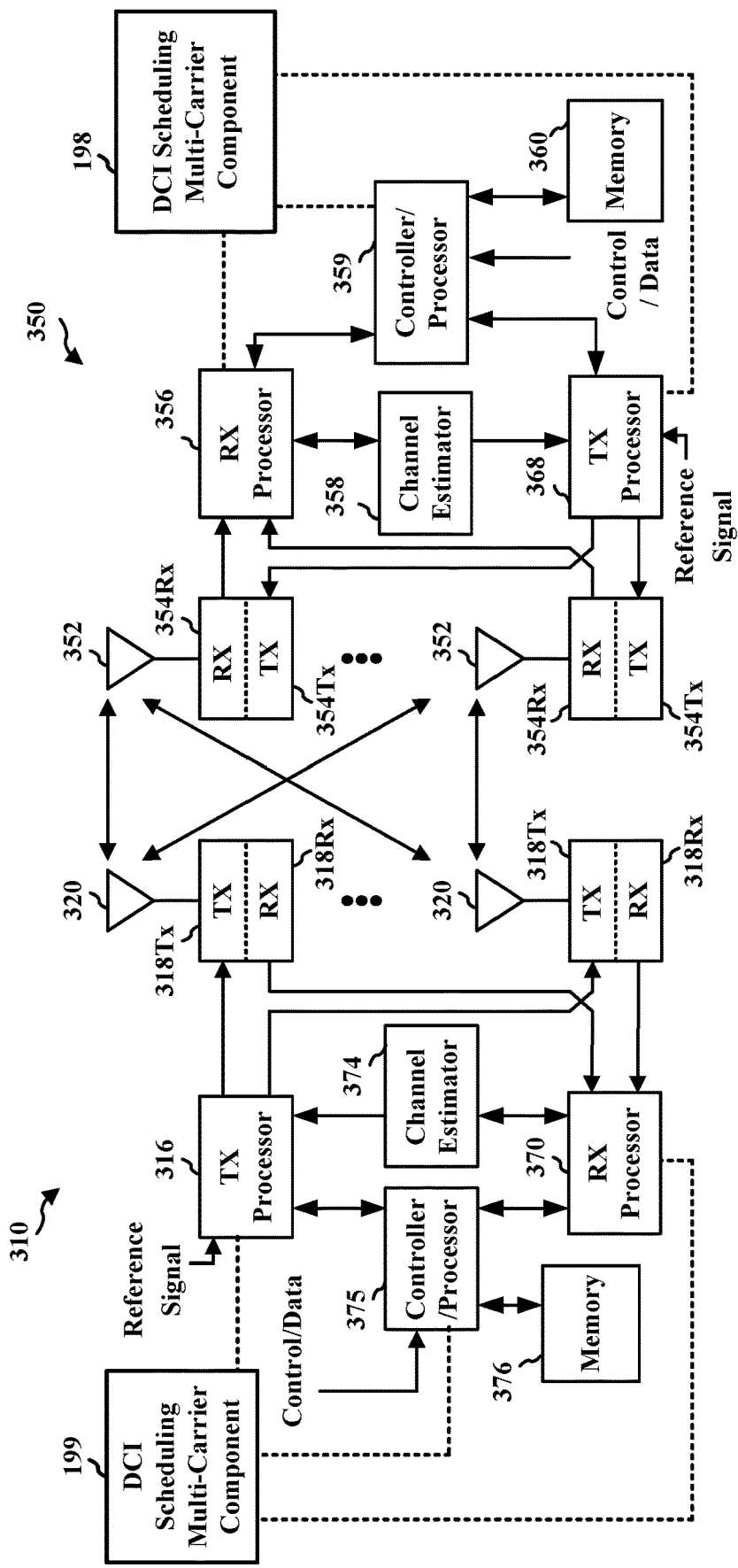
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DCI scheduling multi-carrier component 198 of FIG. 1. At least one of the TX processor 316, the RX processor 370, and the controller/processor 375 may be configured to perform aspects in connection with the DCI scheduling multi-carrier component 199 of FIG. 1.

A UE may receive an allocation of resources from a network for UL data transmission (e.g., PUSCH) in a DG or in a CG that provides semi-static or periodic resources allocated for the UE to use for UL data transmissions. Extended reality (XR) is an example of wireless traffic, among other examples of UL data that may be transmitted by a UE.

XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

XR traffic may arrive in periodic traffic bursts ("XR traffic bursts"). An XR traffic burst may vary in a number of packets per burst and/or a size of each pack in the burst. The traffic bursts may include different numbers of packets, and packets within bursts may vary in size (e.g., may include varying amounts of data).

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in 1/60=16.67 ms periods. In another example, for 120 FPS video data, XR traffic bursts may arrive in 1/120=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow, a UE may expect a first packet of the first XR traffic burst to arrive at time t0, but the first packet of the first XR traffic burst arrives at time t1.

XR traffic may include multiple flows that arrive at a UE (or a base station) concurrently with one another (or within a threshold period of time). The flows may have different characteristics, and may include XR traffic bursts with different numbers of packets, different sizes of packets, etc. In an example, a first XR flow may include video data and a second XR flow may include audio data for the video data. In another example, the first XR flow may include intra-coded picture frames (I-frames) that include complete images and the second XR flow may include predicted picture frames (P-frames) that include changes from a previous image.

XR traffic may have an associated packet delay budget (PDB). If a packet does not arrive within the PDB, a UE (or a base station) may discard the packet. In an example, if a packet corresponding to a video frame of a video does not arrive at a UE within a PDB, the UE may discard the packet, as the video has advanced beyond the frame.

In general, XR traffic may be characterized by relatively high data rates and low latency. The latency in XR traffic may affect the user experience. For instance, XR traffic may have applications in eMBB and URLLC services.

Wireless communication networks, such as a 5G NR network, may be designed to include semi-persistent scheduling (SPS) for grants, such as configured grants (CGs). Additionally, some wireless communications may include traffic with large payloads and short deadlines that benefits from low latency. As an example, extended reality (XR) traffic may have short timeframes for exchange, as well as high data-rate flows such as video. As the traffic is periodically generated by XR application, it may be suitable to use SPS with and CGs for the XR video data transmission. A wireless network may utilize activation of one SPS/CG at a time by DCI and joint release of multiple active CGs by one DCI. When multiple Type 2 CGs are configured for a UE, a HARQ process number field in the activation DCI may indicate the index of the activated CG. Release of multiple Type 2 CGs may rely on a list of sets of configured CGs. When the list is configured, a HARQ process number field in the release DCI may indicate the index of a set of Type 2 CGs to be released. For DL video transmission, a similar use case may exist for DL SPS based PDSCH. Existing wireless networks lack the ability to schedule multiple PUSCHs/PDSCHs per a single scheduling DCI and instead provide a single PUSCH/PDSCH scheduling per single scheduling DCI.

Aspects herein provide for large video frame data size, e.g., in XR, which utilize more than one PUSCHs to be transmitted in each video frame period, for instance, via a multi-PUSCH scheduling DCI to provide the resource allocation information for these PUSCHs. Such aspects may be based on multiple PUSCHs activated for the same CG occasion and/or on multiple CGs jointly activated by the same DCI. Aspects also enable utilization for increased availability of scattered spectrum bands or wider bandwidth spectrum, providing for simultaneous scheduling of multiple cells. Still further, to reduce the control overhead, aspects enhance single-cell scheduling to multi-cell PUSCH/PDSCH scheduling with a single scheduling DCI, while balancing between overhead savings and scheduling restriction.

Accordingly, aspects presented herein provide for multiple PUSCH opportunities around the same CG occasion, as well as joint activation of CGs by the same DCI, and for improvements in flexibility and spectral/power efficiency on scheduling data over multiple cells, including without limitation, intra-band cells and inter-band cells. Aspects include implementing configurations, at a UE, associated with a schedule of a set of CCs, where each CC of the set may include at least two PDSCHs or PUSCHs, and communicating, via the set of CCs, between a UE and a network node based on the schedule of the set of CCs.

Figure 4:
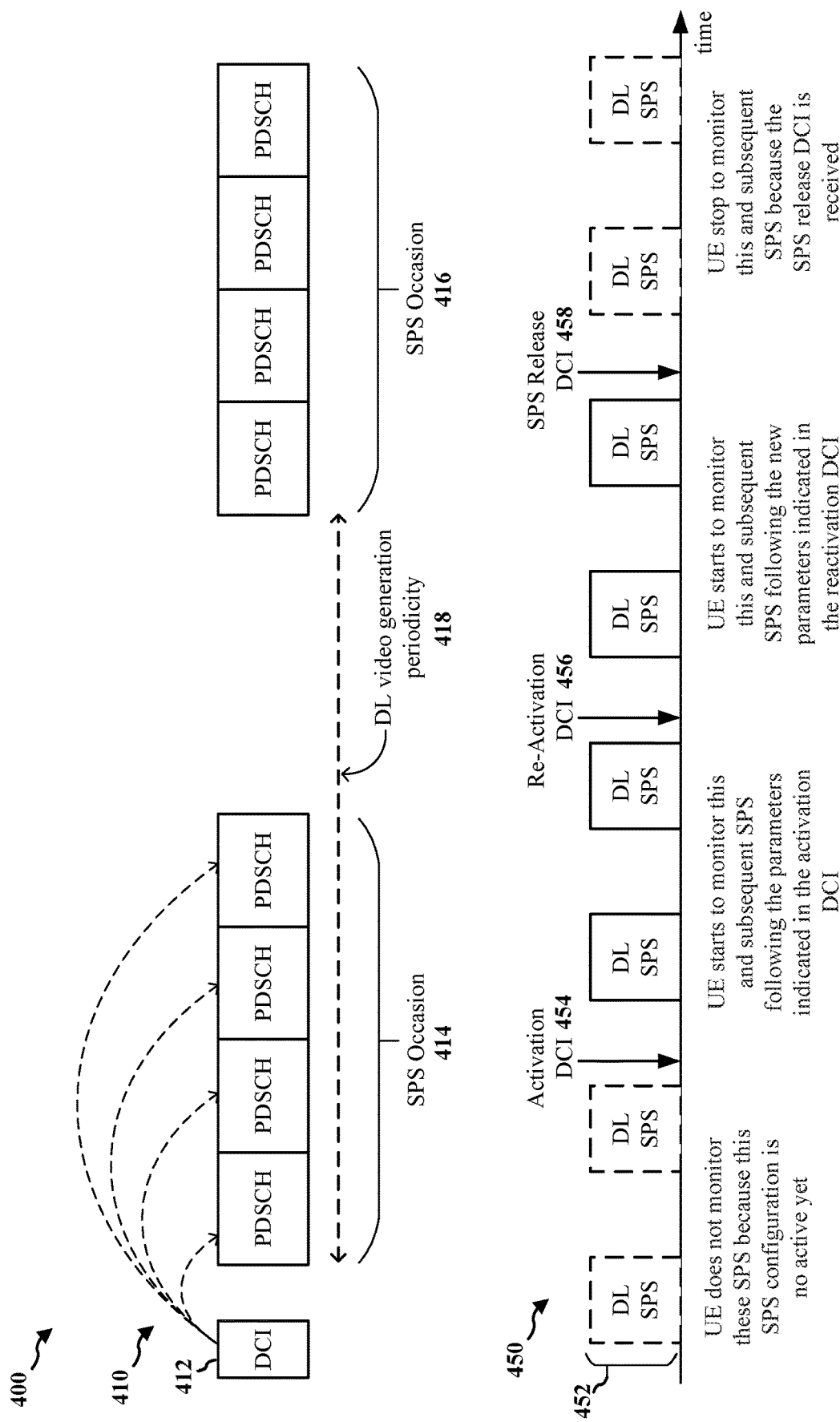
FIG. 4 is a diagram illustrating example semi-persistent scheduling (SPS) configurations, in accordance with various aspects of the present disclosure.

FIG. 4 is a diagram 400 illustrating example semi-persistent scheduling (SPS), in accordance with various aspects of the present disclosure. Diagram 400 shows a SPS configuration 410 and a SPS configuration 450. In the SPS configuration 410, a single-carrier configuration, a DCI 412 may be utilized to schedule multiple PDSCHs over a single SPS occasion 414. That is, a single CG grant SPS occasion with multiple PDSCHs is shown as being activated with a single DCI. Where a DL video generation periodicity 418 shows a time from the start of the SPS occasion 414 and a next SPS occasion 416, multiple CG grant SPS occasions with multiple PDSCHs are shown as being activated with a single DCI.

In the SPS configuration 450, shown with respect to time, RRC signaling may configure the SPS periodicity and HARQ-ACK feedback resources, and SPS activation/reactivation DCI, and SPS release DCI are shown. For instance, multiple DL SPS occasions 452 are shown in SPS configuration 450. Initially, two DL SPS occasions are not monitored by a UE, e.g., when a SPS configuration is not yet active. The network, e.g., a base station, gNB, etc., may use SPS activation DCI 454 to activate a certain configured SPS. In the SPS activation DCI 454, the network may indicate Tx parameters such as MCS, RB allocation, antenna ports of the SPS transmission, and/or the like. Subsequently, the UE may start to monitor a next and subsequent DL SPSs (e.g., the third and fourth DL SPSs) following the parameters indicated in the SPS activation DCI 454. Next, the network may use SPS reactivation DCI 456 to change the Tx parameters such as the MCS, the RB allocation, the antenna ports of the SPS, and/or the like. Thus, UE starts to monitor a next and subsequent DL SPSs (e.g., the fifth and sixth DL SPSs) following the new parameters indicated in the SPS reactivation DCI 456. Finally, the network may use SPS release DCI 458 to deactivate a configured SPS, which may cause the UE to stop monitoring a next and subsequent DL SPSs (e.g., the final two DL SPSs) based on the SPS release DCI 458 being received.

Figure 5:
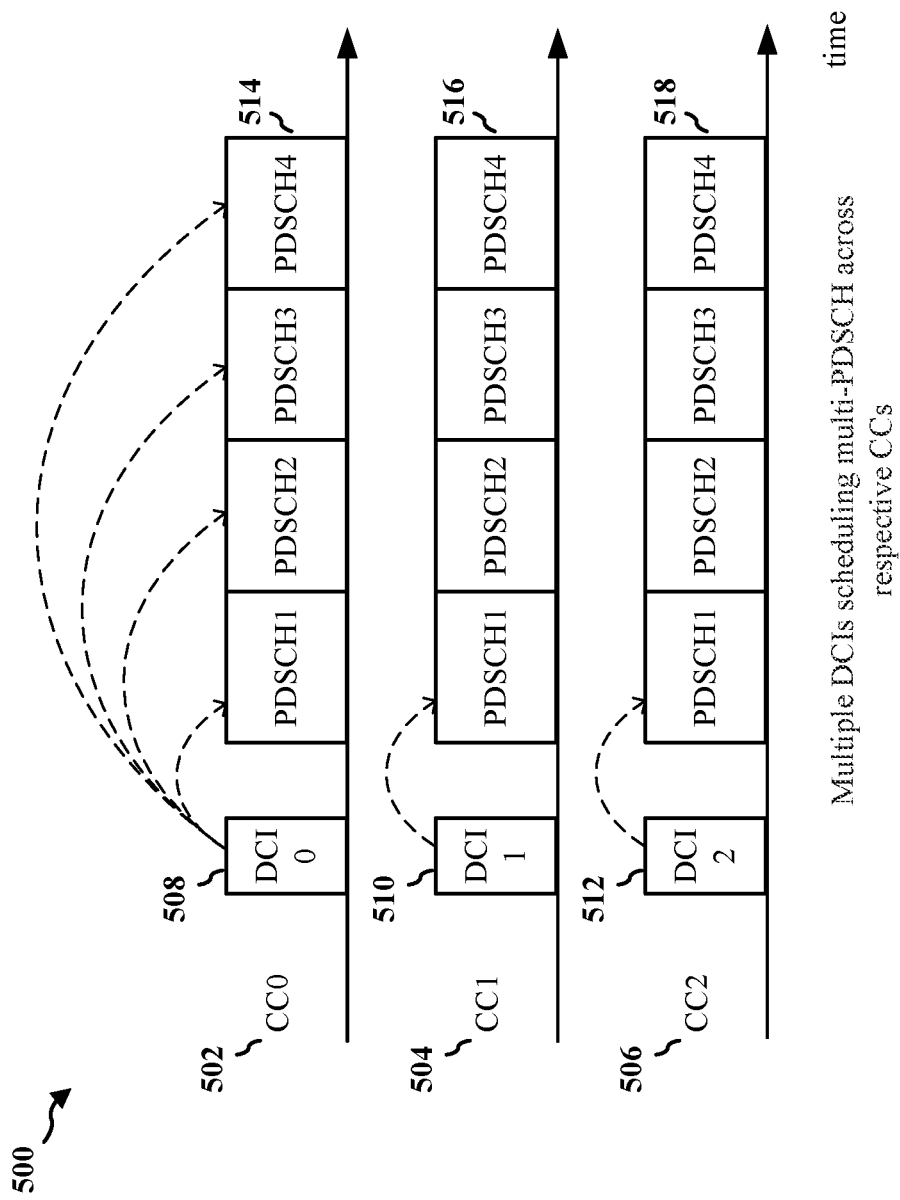
FIG. 5 is a diagram illustrating example downlink control information (DCI) scheduling, in accordance with various aspects of the present disclosure.

FIG. 5 is a diagram 500 illustrating example downlink control information (DCI) scheduling, in accordance with various aspects of the present disclosure. Diagram 500 shows single-cell PUSCH/PDSCH scheduling (a single PDSCH/PUSCH per cell) with a single DCI. For example, diagram 500 includes component carriers (CCs): a first CC 502 (CC0), a second CC 504 (CC1), and a third CC 506 (CC2). CC0 502 includes a DCI 508 that schedules multiple PDSCHs 514 across the CC0 502. CC1 504 includes a DCI 1 510 that schedules multiple PDSCHs 516 across the CC0 504. CC2 506 includes a DCI 2 512 that schedules multiple PDSCHs 518 across the CC2 506. That is, diagram 500 illustrates multiple DCIs scheduling multi-PDSCH across respective CCs, where each CC is configured according to its own, separate DCI. A CC may be an aggregation of carriers, described above, in the aspects herein.

Figure 6:
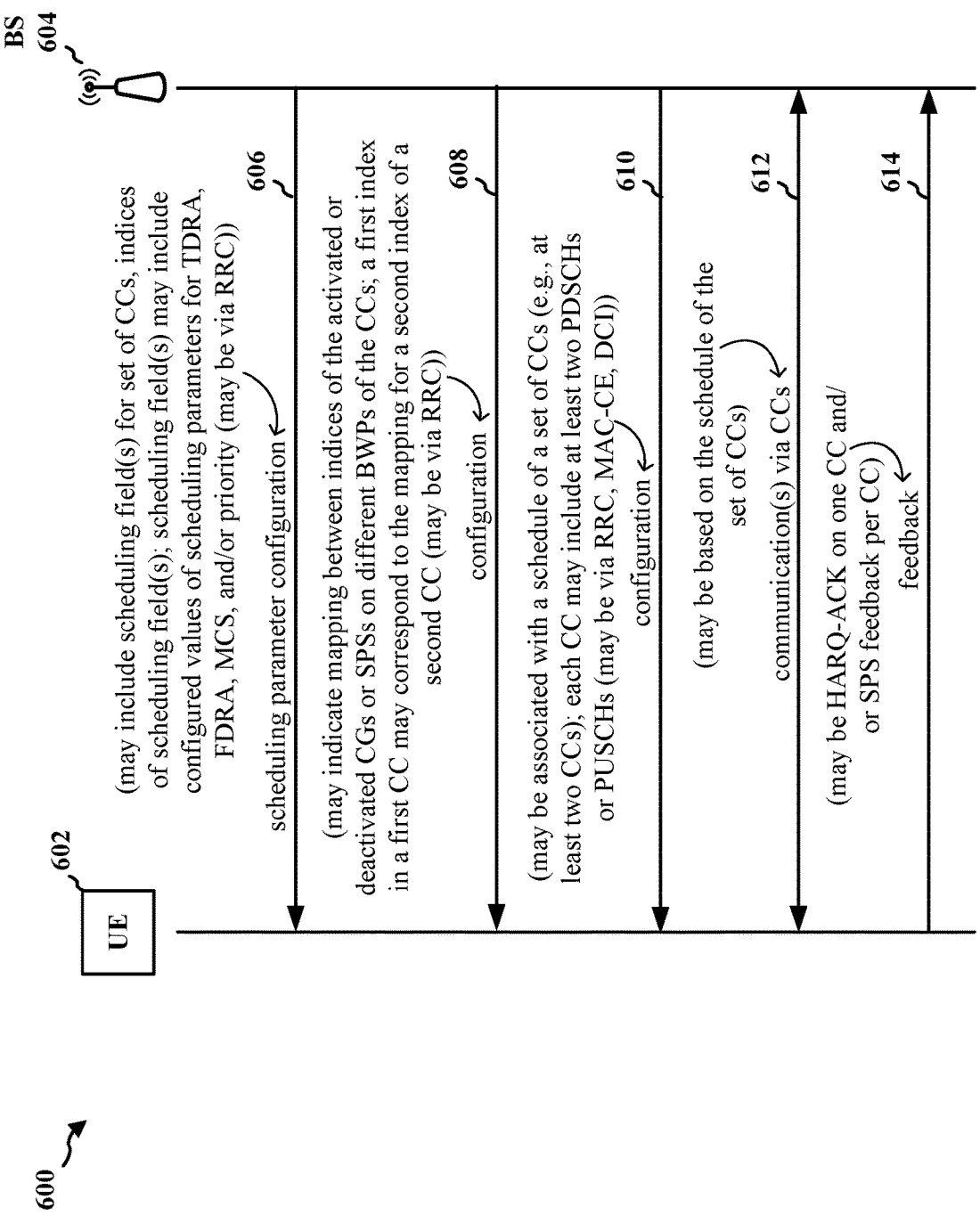
FIG. 6 is a call flow diagram for wireless communications, in accordance with various aspects of the present disclosure.

FIG. 6 shows a call flow diagram 600 for wireless communications, in various aspects. Call flow diagram 600 illustrates single DCI scheduling multi-carrier for multi-slot PXSCHS and multi-SPS/CG PDSCH in wireless communications, and illustrates configuring a UE 602 for single DCI scheduling multi-carrier for multi-slot PXSCHS and multi-SPS/CG PDSCH via configurations from a network node (a base station 604, such as a gNB or other type of base station, by way of example, as shown), in various aspects. Aspects described for the base station 604 may be performed by the base station in aggregated form and/or by one or more components of the base station in disaggregated form. Additionally, or alternatively, the CLPC adjustment state resetting/maintenance may be performed by the UE 602 autonomously, in addition to, and/or in lieu of, configurations provided to the UE 602 from the base station 604.

In the illustrated aspect, the UE 602 may be configured to receive, from the base station 604, a scheduling parameter configuration 606. The scheduling parameter configuration 606 may include a scheduling field(s) for a set of CCs, indices of scheduling field(s), and the scheduling field(s) may include configured values of scheduling parameters for TDRA, FDRA, MCS, and/or priority. That is, for aspects herein, a scheduling field may be a field that corresponds to a single DCI that schedules multiple PXSCHs. In aspects, the scheduling parameter configuration 606 may be received by the UE 602 via RRC signaling. In aspects, the UE 602 may also be configured to receive, from the base station 604, a configuration 608. The configuration 608 may indicate a mapping between indices of the activated or deactivated CGs or SPSs on different BWPs of the CCs. In aspects, a first index in a first CC may correspond to the mapping for a second index of a second CC. In aspects, the configuration 608 may be received by the UE 602 via RRC signaling. The UE 602 may also be configured to receive, from the base station 604, a configuration 610. The configuration 610 may be associated with a schedule of a set of CCs (e.g., at least two CCs in the set of CCs). In aspects, each CC of the set of CCs may include at least two PDSCHs or PUSCHs. In aspects, the configuration 610 may be received by the UE 602 via RRC signaling, a MAC-CE, and/or DCI.

In aspects for receiving the configuration 610 at the UE 602 via DCI, the utilized DCI may be repeated with repetition factor, for example but without limitation, as a repetition factor for linked PDCCH repetition (e.g., as extended from the activation DCI 454, the re-activation DCI 456, and the SPS release DCI 458 described above with respect to FIG. 4). In alternative aspects, the repetition may be across the CCs with linked DCIs, as described below with respect to FIG. 9. The repetition factor may be RRC/MAC-CE indicated or specified by default.

Accordingly, based on one or more of the scheduling parameter configuration 606, the configuration 608, and/or the configuration 610, the UE 602 may be configured according to aspects herein for single-DCI scheduling multi-carrier multi-SPS/CG PDSCHs and/or single-DCI scheduling multi-carrier multi-slot PUSCHs/PDSCHs (PXSCHs). The UE 602 may thus be configured to receive/transmit communications 612 (e.g., to communicate) with the base station 604 via the CCs, based on the scheduling parameter configuration 606, the configuration 608, and/or the configuration 610. That is, the UE 602 may communicate the communications 612 with the base station 604 based on the schedule of the set of CCs.

The UE 602 may be further configured to transmit feedback 614 to the base station 604. For example, the feedback 614 may be HARQ-ACK feedback and/or SPS feedback. In aspects, where the feedback 614 is HARQ-ACK feedback, the feedback 614 may be provided on one CC of the set of CCs, and the CC on which the feedback 614 is provided may be the CC on which the DCI was received. In aspects, where the feedback 614 is SPS feedback, the feedback 614 may be provided for each CC in the set of CCs.

Figure 7:
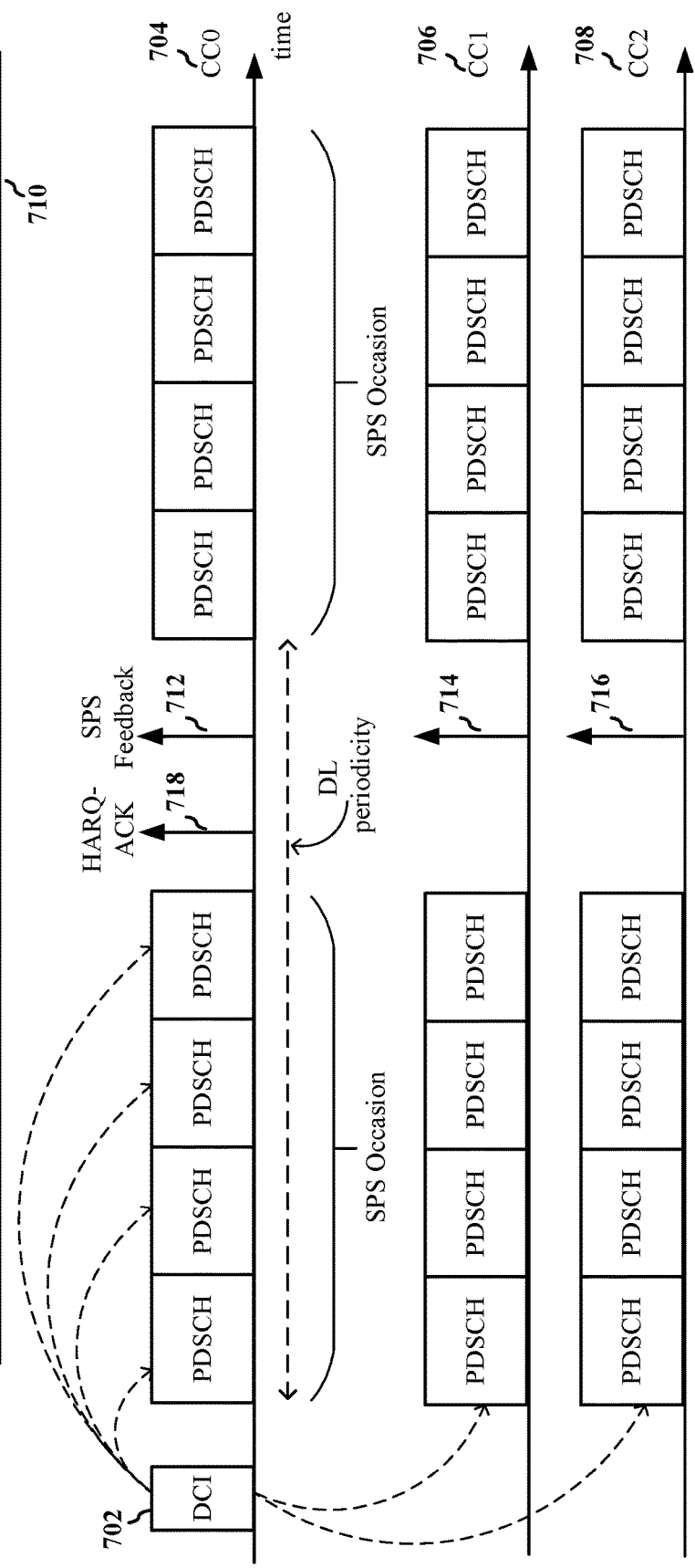
FIG. 7 is a diagram illustrating example configurations for single-DCI scheduling multi-carrier multi-SPS/CG PDSCHs, in accordance with various aspects of the present disclosure.

FIG. 7 is a diagram 700 illustrating example configurations for single-DCI scheduling multi-carrier multi-SPS/CG PDSCHs, in various aspects. Diagram 700 includes multiple CCs shown as a CC0 704, a CC1 706, and a CC2 708, each including two (or more, not shown for illustrative clarity and brevity) SPS occasions and a DL periodicity as similarly described with respect to FIG. 4. However, extending the aspects illustrated in FIG. 4, diagram 700 shows a single DCI 702 that schedules the SPS occasions for each of the CC0 704, the CC1 706, and the CC2 708.

A single DCI activating a single CG/SPS with multiple PUSCHs/PDSCHs on a CG/SPS occasion or activating multiple CGs/SPSs with one PUSCH/PDSCH on an occasion of each CG/SPS allows the activation/reactivation/release over multi-carriers. The single DCI scheduling multi-PDSCH/PUSCH can be starting point for this DCI or new DCIs can be designed solely for this activation/reactivation/release over multiple carriers.

In other words, aspects herein, as illustrated for diagram 700, provide for a single DCI 702 activating multiple SPSs over one or more CCs (e.g., 704, 706, 708). For instance, SPS configurations for a UE may be configured with the same SPS configuration index across the CCs, and thus the DCI 702 may indicate a single SPS configuration index that may be applied across the CCs (e.g., 704, 706, 708). Aspects also provide, alternatively or in addition, for a HARQ process number field to indicate multiple SPS configurations, where the HARQ process numbers may be associated with the multiple CCs 704, 706, 708 based on ordering, e.g., a first SPS configuration is activated in a first carrier (e.g., CC0 704), a second SPS configuration is activated in a second carrier (e.g., CC1 706), a third SPS configuration is activated in a third carrier (e.g., CC2 708), etc. Additionally, parameters may be different across the multiple SPS/CG opportunities over multiple CC, which may utilize different values for TDRA, FDRA, num ports (e.g., number of ports), K1 (e.g., an indication of a time delay between a PDSCH slot and the UCI slot for ACK/NACK), and/or the like, as shown in fields 710. Further, such dynamic parameters may be the same across all activated SPS opportunities across all of the CCs (e.g., 704, 706, 708). For instance, based on fields 710, a UE may be configured for joint encoding of TDRAs, FDRA, K1, or numbers of ports such that a MCS field may represent a set of values across the group of CCs (e.g., the CC0 704, the CC1 706, and the CC2 708). Such aspects also allow for updating the periodicity using the DCI for one or more of the SPSs across the CCs.

In aspects, the MCS field values may represent configurations for different CCs. For example, an MCS 0 on CC0 704 may corresponds to the CC1 706 MCS being 1, the CC2 708 MCS being 4, etc. The TDRA (K0) values may represent that an offset between the different CCs is possible, and k0 may be different between different CCs. The FDRA values may represent that the FDRA fields may be different between CCs. The num ports (e.g., number of ports) values may represent the same or different numbers of ports values for the different CCs. The K1 values may represent that such values may be different for different CCs and may map to the same resource on different CCs. Periodicity values may represent a common periodicity for one or more of the CCs (while in some aspects each SPS may be updated using this field).

Further, aspects herein may include the use of separate activation fields in the single DCI 702 to indicate the activation/deactivation of multiple CGs/SPSs with one PUSCH/PDSCH on an occasion of each CG/SPS where the activation is over multi-carriers (e.g., the CC0 704, the CC1 706, and/or the CC2 708). Aspects also provide for separate deactivation fields in the single DCI 702 that may indicate the activation/deactivation of multiple CGs/SPSs with one PUSCH/PDSCH on an occasion of each CG/SPS where the activation is over multi-carriers (e.g., the CC0 704, the CC1 706, and/or the CC2 708). In aspects, to mitigate possible increases in overhead due to separate indications as noted above, an RRC configuration may define and/or configure a mapping between the indices of the activated/released SPSs/CGs on different CCs' BWPs. For example, an index configured in one CC may correspond to a mapped index in another CC, and therefore, activation by any field on one CC may simultaneously activate the occasions on another CC. In other words, the same SPS across all CCs and index may be interpreted based on which CC the activation DCI 702 was received. This allows a common SPS usage across active BWPs within a group of CCs (e.g., CCs grouped to be SPS activated/reactivated/released together).

Still further, aspects herein may include timer-based CG/SPS set switching that may simultaneously activate one set of CGs/SPSs and deactivate another set of CGs/SPSs for adaptive CG/SPS configuration over the multi-CCs described herein. In aspects, such timer-based switching may be introduced per CC (e.g., the CC0 704, the CC1 706, and/or the CC2 708). In aspects, the timer(s) values for the multiple CCs may be configured via RRC signaling, and such value for SPS set switching may also be indicated by the activation DCI 702 by repurposing other fields thereof. Moreover, while aspects above may be in the context of Type 2 CGs, aspect herein also provide for the extension of Type 1 CGs to multiple CCs through RRC configurations, which allows activation of the single SPS/CG occasion with multiple SPSs/CGs.

Finally, aspects provide for additional considerations for the DCI 702 such that activation, reactivation, and/or release via DCI may be repeated across time for the same CC where the DCI is supposed to be received or repeated across CCs and time. Such DCIs may be linked where their search space, aggregation level (AL), and/or or configurations are connected or common. In such aspects, the corresponding HARQ-ACK feedback may be sent on the CC where the activation DCI was received (which may provide the benefit of bundling), as illustrated by HARQ-ACK 718 for CC0 704, which also applies to CC1 706 and CC2 708 that do not have their own respective HARQ-ACK feedback. Further, in such aspects, each SPS feedback may be sent on its corresponding CC, as illustrated by SPS feedback 712 for CC0 704, by SPS feedback 714 for CC1 706, by SPS feedback 716 for CC2 706.

Figure 8:
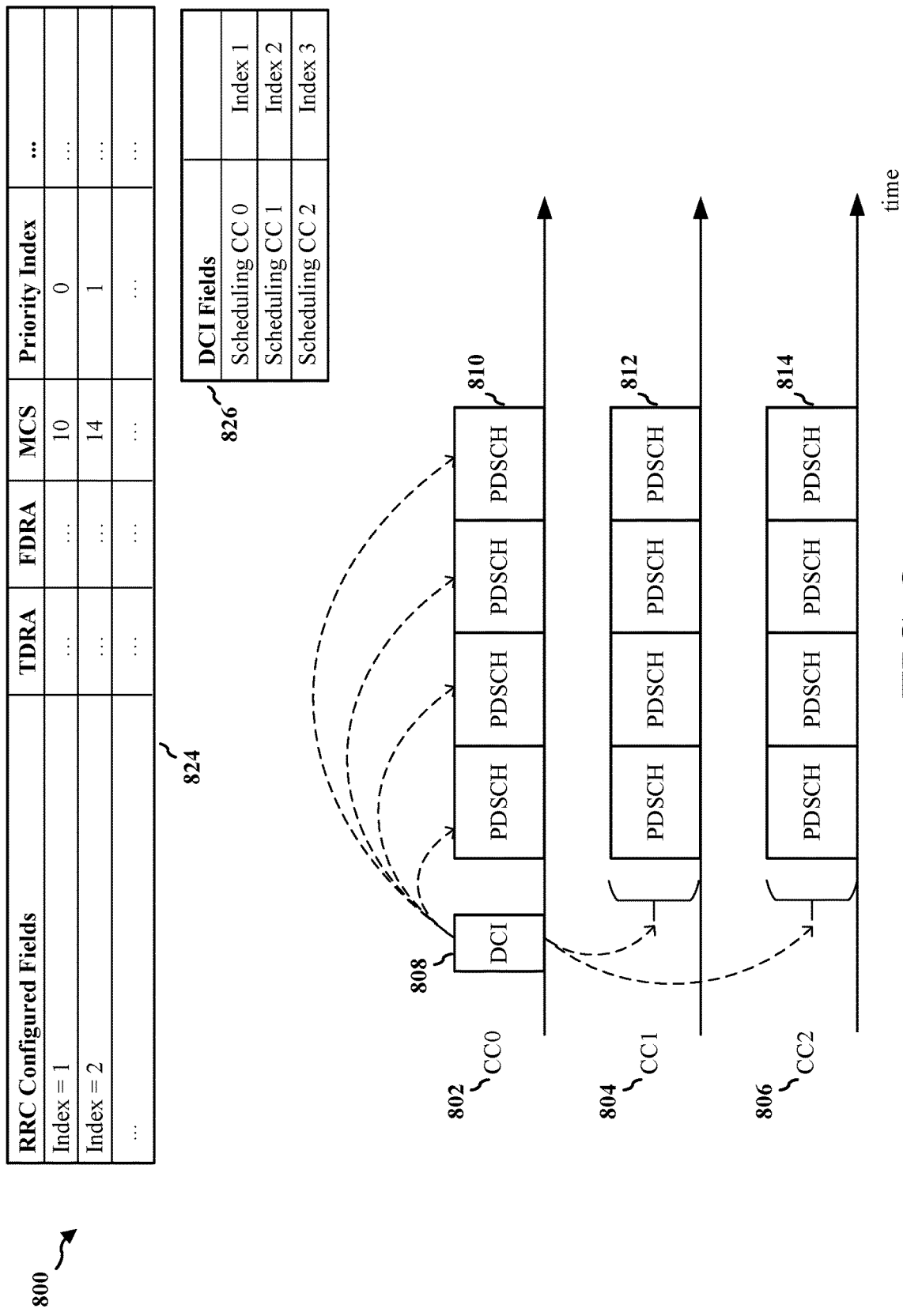
FIG. 8 is a diagram illustrating example configurations for single-DCI scheduling multi-carrier multi-slot PUSCHs/PDSCHs (PXSCHs), in accordance with various aspects of the present disclosure.

FIG. 8 is a diagram 800 illustrating example configurations for single-DCI scheduling multi-carrier multi-slot PUSCHs/PDSCHs (PXSCHs), in various aspects. Diagram 800 includes multiple CCs shown as a CC0 802, a CC1 804, and a CC2 806, each including two (or more, not shown for illustrative clarity and brevity) PXSCHs as similarly described with respect to FIG. 5. However, extending the aspects illustrated in FIG. 5, diagram 800 shows a single DCI 808 that schedules the PXSCHs for each of the CC0 802, the CC1 804, and the CC2 806. It should be noted that while PDSCHs are shown in diagram 800 by way of example, the described aspects are also applicable to PUSCHs, as would be understood by persons of skill in the relevant art(s) having the benefit of this disclosure.

For example, diagram 800 shows the single DCI 808 scheduling multi-PXSCHs (multiple PDSCHs: PDSCHs 810, PDSCHs 812, and PDSCHs 814) respectively across CCs (e.g., the CC0 802, the CC1 804, and the CC2 806) may include various fields corresponding to the single DCI 808 scheduling multi-PXSCHs, where the fields may cover the different CCs (e.g., 802, 804, and 806). In aspects, for scheduling over 3 CCs such as the CC0 802, the CC1 804, and the CC2 806, the DCI 808 may include corresponding fields of TDRA1, TDRA2, TDRA3, FDRA1, FDRA2, FDRA3, MCS1, MCS2, MCS3, with respective numeric designations corresponding to those of the CCs.

Aspects herein may account for the overhead of such configurations, which may be large and affect the reliability of decoding the DCI), and accordingly improve performance of communication and power usage, by configuring the single DCI 808 to schedule multi-PXSCHs across CCs utilizing an index to RRC configured scheduling parameters for the CCs. For example, such scheduling parameters may include, without limitation, FDRA, TDRA, MCS, priority index, and/or the like, as noted herein. For example, such an RRC configuration may include a number of configured TDRA, FDRA, MCS, and/or priority index fields, as illustrated in RRC configured fields 824. Additionally, aspects may include an index for each CC in the DCI 808 to describe the fields, as illustrated in DCI fields 826.

Figure 9:
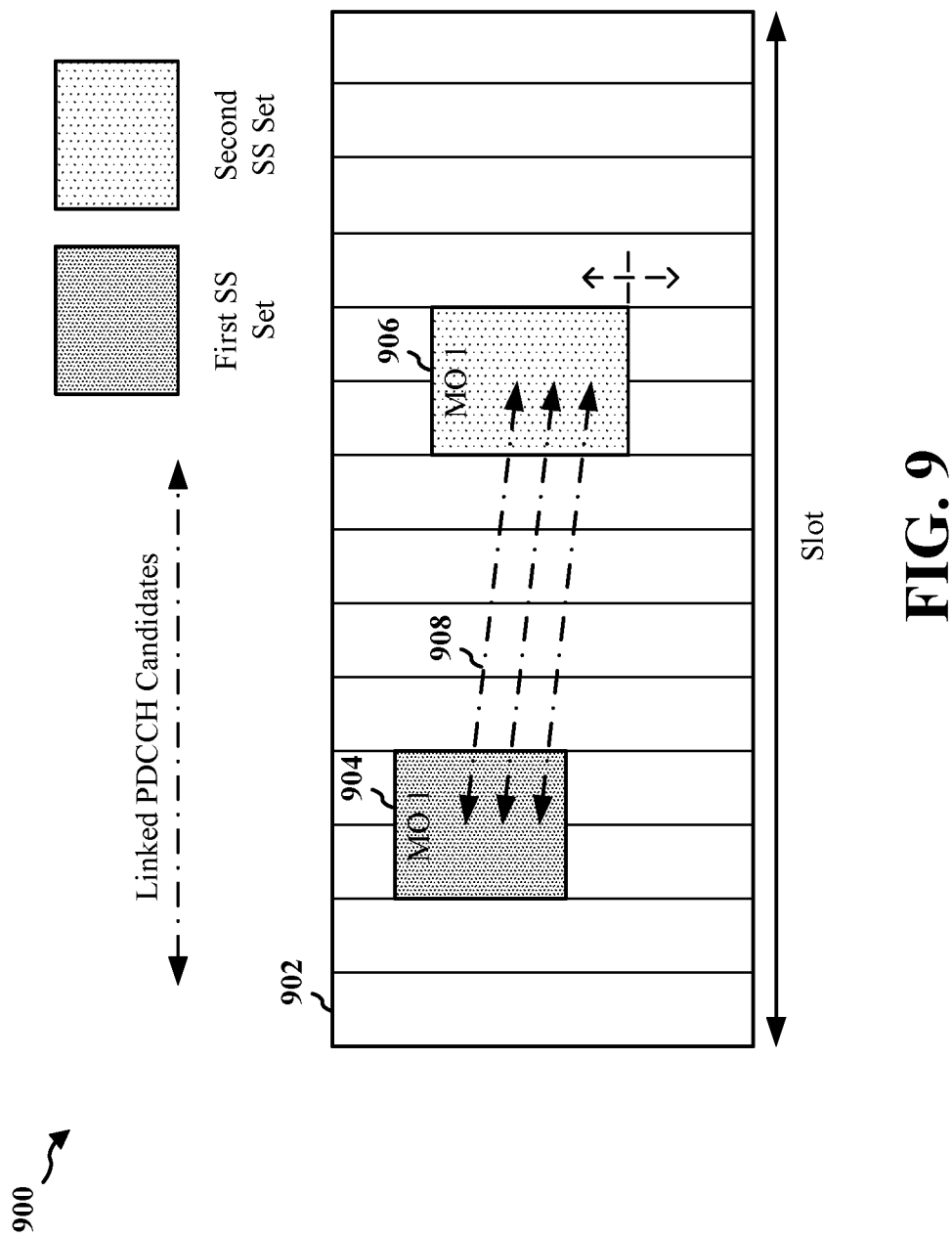
FIG. 9 is a diagram illustrating example two-stage DCI on a CC, in accordance with various aspects of the present disclosure.

In furtherance of the aspects described with respect to FIG. 8 above, FIG. 9 will now be described. FIG. 9 is a diagram 900 illustrating example two-stage DCI for a CC, in various aspects. For example, diagram 900 shows a slot 902 in which a first DCI 904 (monitoring occasion (MO) 1, representing a first search space (SS) set) and a second DCI 906 (MO 1, representing a second SS set) are provided. The first DCI 904 (e.g., a first stage) and the second DCI 906 (e.g., a second stage) may be a two-stage DCI, according to aspects.

In some aspects, a two-stage DCI such as the first DCI 904 (e.g., a first stage) with the second DCI 906 (e.g., a second stage) may include different scheduling fields in the first stage and the second stage. Additionally, the second stage (the second DCI 906) may be transmitted on the same CC and in the same slot as the first stage (the first DCI 904). In aspects, the first DCI 904 may include a bit(s) that indicates whether the fields in this DCI are to be applied to all CCs, e.g., as described above, or whether there is another DCI, such as the second DCI 906, which can differentiate some fields within the different CCs.

In aspects, the second stage DCI, such as the second DCI 906, may include differential information across the CCs, while the first DCI 904 may include baseline information for the CCs. For example, the second stage DCI (e.g., the second DCI 906) may include "delta" or differential MCS information across the different CCs (e.g., the CC0 802, the CC1 804, and the CC2 806 described above for FIG. 8) that provides a variance/difference over the baseline information the first stage DCI (e.g., the first DCI 904). Further, the second DCI 906 may have a configurable size which may depends on the differential information between the CCs.

Moreover, a two-stage DCI according to aspects herein, e.g., the first DCI 904 (e.g., as the first stage) with the second DCI 906 (e.g., as the second stage), may be linked DCIs similar to DCIs for PDCCH repetition. In aspects, the search space of the first DCI 904 scheduling multi-PDSCHs across CCs is linked to the second DCI 906 through linked PDCCH candidates 908 in the DCIs.

Figure 10:
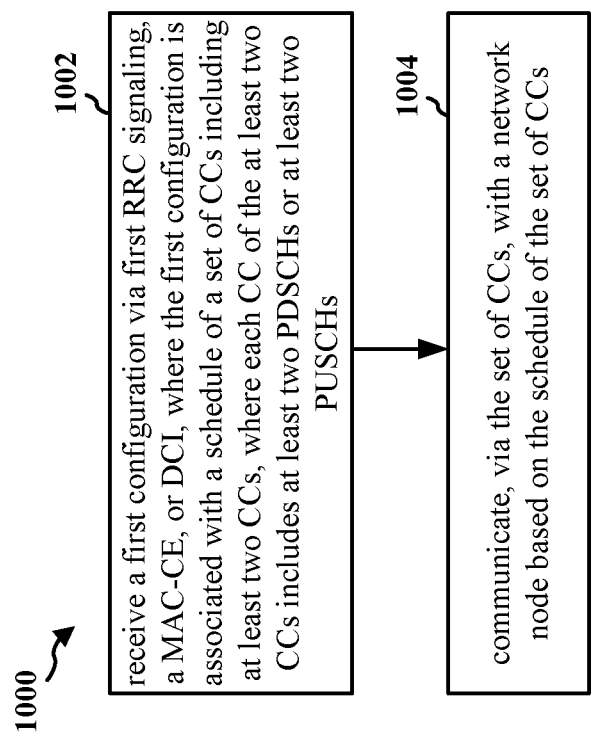
FIG. 10 is a flowchart of a method of wireless communication, in accordance with various aspects of the present disclosure.

FIG. 10 is a flowchart 1000 of a method of wireless communication, in various aspects. The method may be performed by a UE (e.g., the UE 104, 602; the apparatus 1404). At 1002, the UE is configured to receive a configuration via first RRC signaling, a MAC-CE, or DCI, where the configuration is associated with a schedule of a set of CCs including at least two CCs, where each CC of the at least two CCs includes at least two PDSCHs or at least two PUSCHs. In some aspects, 1002 may be performed by the component 198. For instance, with reference to FIGS. 6, 7, 8, 9, the UE 602 may be configured to receive, from the base station 604, a scheduling parameter configuration 606. The scheduling parameter configuration 606 may include a scheduling field(s) (e.g., 710 in FIG. 7) for a set of CCs (e.g., 704, 706, 708 in FIG. 7), indices of scheduling field(s) (e.g., 710 in FIG. 7; 824, 826 in FIG. 8), and the scheduling field(s) (e.g., 710 in FIG. 7) may include configured values of scheduling parameters for TDRA, FDRA, MCS, and/or priority (e.g., 710 in FIG. 7). In aspects, the scheduling parameter configuration 606 may be received by the UE 602 via RRC signaling. In aspects, the UE 602 may also be configured to receive, from the base station 604, a configuration 608. The configuration 608 may indicate a mapping between indices (e.g., 710 in FIG. 7; 824, 826 in FIG. 8) of the activated or deactivated CGs or SPSs on different BWPs of the CCs (904, 906 in FIG. 9). In aspects, a first index in a first CC may correspond to the mapping for a second index of a second CC (e.g., 710 in FIG. 7; 824, 826 in FIG. 8; 904, 906 in FIG. 9). In aspects, the configuration 608 may be received by the UE 602 via RRC signaling. The UE 602 may also be configured to receive, from the base station 604, a configuration 610. The configuration 610 may be associated with a schedule of a set of CCs (e.g., at least two CCs in the set of CCs) (e.g., on 704, 706, 708 in FIG. 7; 802, 804, 806 in FIG. 8). In aspects, each CC of the set of CCs (e.g., on 704, 706, 708 in FIG. 7; 802, 804, 806 in FIG. 8) may include at least two PDSCHs or PUSCHs (e.g., SPS occasions on 704, 706, 708 in FIG. 7; 810, 812, 814 in FIG. 8).

In aspects, the configuration 610 may be received by the UE 602 via RRC signaling, a MAC-CE, and/or DCI (e.g., 702 in FIG. 7; 808 in FIG. 8).

At 1004, the UE is also configured to communicate, via the set of CCs, with a network node based on the schedule of the set of CCs. In some aspects, 1004 may be performed by the component 198. For instance, with reference to 6, 7, 8, 9, the UE 602 may be configured to receive/transmit communications 612 (e.g., to communicate) with the base station 604 via the CCs (e.g., on 704, 706, 708 in FIG. 7; 802, 804, 806 in FIG. 8), based on the scheduling parameter configuration 606, the configuration 608, and/or the configuration 610. That is, the UE 602 may communicate the communications 612 with the base station 604 based on the schedule (e.g., 710 in FIG. 7; 824, 826 in FIG. 8; 904, 906 in FIG. 9) of the set of CCs (e.g., on 704, 706, 708 in FIG. 7; 802, 804, 806 in FIG. 8).

Figure 11:
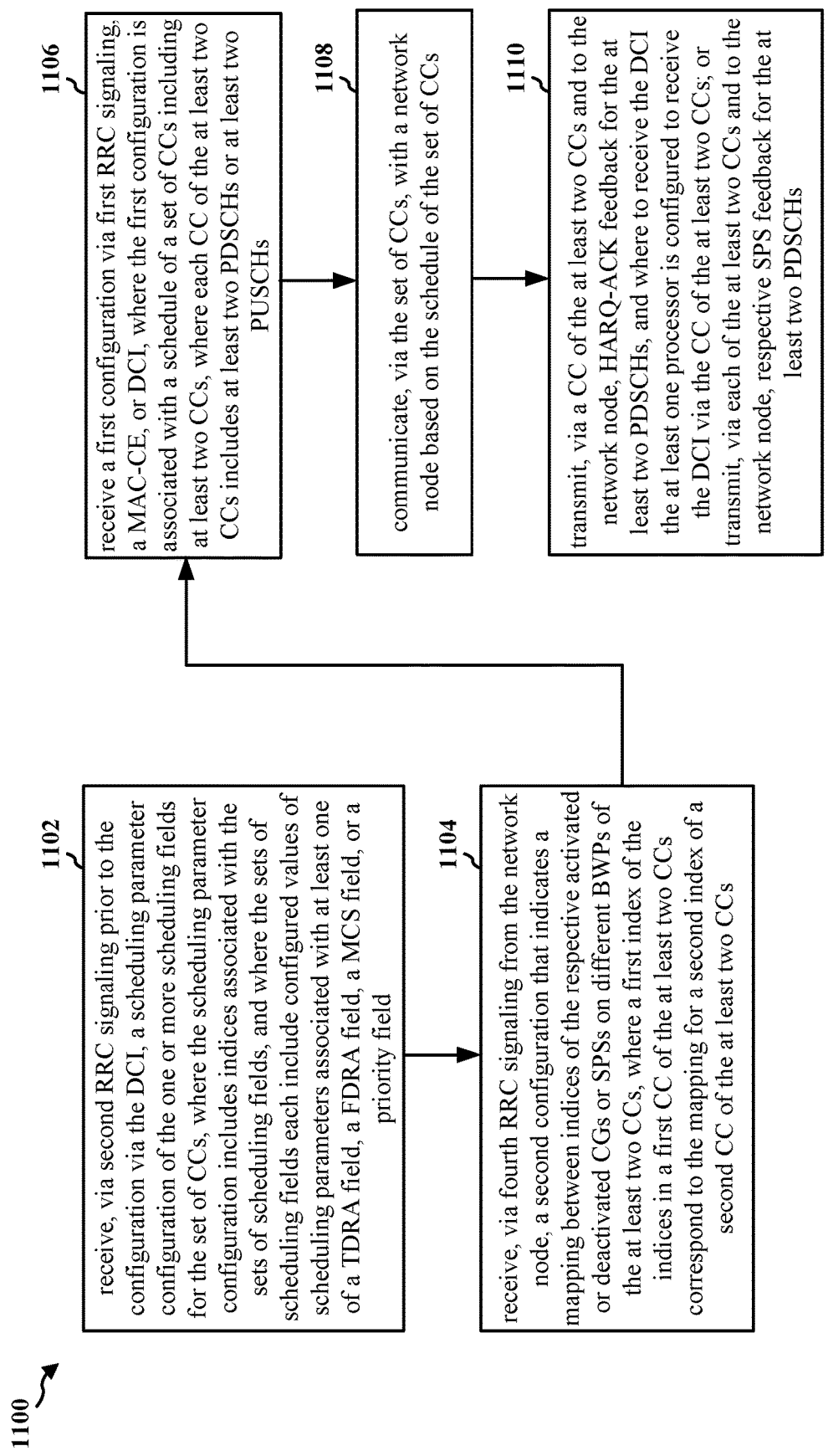
FIG. 11 is a flowchart of a method of wireless communication, in accordance with various aspects of the present disclosure.

FIG. 11 is a flowchart 1100 of a method of wireless communication, in various aspects. The method may be performed by a UE (e.g., the UE 104, 602; the apparatus 1404). At 1102, the UE is configured to may be configured to receive, via second RRC signaling prior to the configuration via the DCI, a scheduling parameter configuration of the one or more scheduling fields for the set of CCs, where the scheduling parameter configuration includes indices associated with the sets of scheduling fields, and where the sets of scheduling fields each include configured values of scheduling parameters associated with at least one of a TDRA field, a FDRA field, a MCS field, or a priority field. In some aspects, 1102 may be performed by the component 198. For instance, with reference to 6, 7, 8, the UE 602 may be configured to receive, from the base station 604, a scheduling parameter configuration 606. The scheduling parameter configuration 606 may include a scheduling field(s) (e.g., 710 in FIG. 7) for a set of CCs (e.g., 704, 706, 708 in FIG. 7), indices of scheduling field(s) (e.g., 710 in FIG. 7; 824, 826 in FIG. 8), and the scheduling field(s) (e.g., 710 in FIG. 7) may include configured values of scheduling parameters for TDRA, FDRA, MCS, and/or priority (e.g., 710 in FIG. 7). In aspects, the scheduling parameter configuration 606 may be received by the UE 602 via RRC signaling.

At 1104, the UE is configured to receive, via fourth RRC signaling from the network node, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. In some aspects, 1104 may be performed by the component 198. For instance, with reference to 6, 7, 8, 9, the UE 602 may be configured to receive, from the base station 604, a configuration 608. The configuration 608 may indicate a mapping between indices (e.g., 710 in FIG. 7; 824, 826 in FIG. 8) of the activated or deactivated CGs or SPSs on different BWPs of the CCs (904, 906 in FIG. 9). In aspects, a first index in a first CC may correspond to the mapping for a second index of a second CC (e.g., 710 in FIG. 7; 824, 826 in FIG. 8; 904, 906 in FIG. 9). In aspects, the configuration 608 may be received by the UE 602 via RRC signaling.

At 1106, the UE is configured to receive a first configuration via first RRC signaling, a MAC-CE, or DCI, where the first configuration is associated with a schedule of a set of CCs including at least two CCs, where each CC of the at least two CCs includes at least two PDSCHs or at least two PUSCHs. In some aspects, 1106 may be performed by the component 198. For instance, with reference to 6, 7, 8, 9, the UE 602 may be configured to receive, from the base station 604, a configuration 610. The configuration 610 may be associated with a schedule of a set of CCs (e.g., at least two CCs in the set of CCs) (e.g., on 704, 706, 708 in FIG. 7; 802, 804, 806 in FIG. 8). In aspects, each CC of the set of CCs (e.g., on 704, 706, 708 in FIG. 7; 802, 804, 806 in FIG. 8) may include at least two PDSCHs or PUSCHs (e.g., SPS occasions on 704, 706, 708 in FIG. 7; 810, 812, 814 in FIG. 8). In aspects, the configuration 610 may be received by the UE 602 via RRC signaling, a MAC-CE, and/or DCI (e.g., 702 in FIG. 7; 808 in FIG. 8).

At 1108, the UE is also configured to communicate, via the set of CCs, with a network node based on the schedule of the set of CCs. In some aspects, 1108 may be performed by the component 198. For instance, with reference to 6, 7, 8, 9, the UE 602 may be configured to receive/transmit communications 612 (e.g., to communicate) with the base station 604 via the CCs (e.g., on 704, 706, 708 in FIG. 7; 802, 804, 806 in FIG. 8), based on the scheduling parameter configuration 606, the configuration 608, and/or the configuration 610. That is, the UE 602 may communicate the communications 612 with the base station 604 based on the schedule (e.g., 710 in FIG. 7; 824, 826 in FIG. 8; 904, 906 in FIG. 9) of the set of CCs (e.g., on 704, 706, 708 in FIG. 7; 802, 804, 806 in FIG. 8).

Finally, at 1110, the UE is also configured to transmit, via a CC of the at least two CCs and to the network node, HARQ-ACK feedback for the at least two PDSCHs, and where to receive the DCI the at least one processor is configured to receive the DCI via the CC of the at least two CCs; or transmit, via each of the at least two CCs and to the network node, respective SPS feedback for the at least two PDSCHs. In some aspects, 1110 may be performed by the component 198. For instance, with reference to 6, 7, the UE 602 may be configured to transmit feedback 614 (e.g., 712, 714, 716, 718 in FIG. 7) to the base station 604. For example, the feedback 614 may be HARQ-ACK feedback (e.g., 718 in FIG. 7) and/or SPS feedback (e.g., 712, 714, 716 in FIG. 7). In aspects, where the feedback 614 is HARQ-ACK feedback (e.g., 718 in FIG. 7), the feedback 614 may be provided on one CC (e.g., CC0 704 in FIG. 7) of the set of CCs (e.g., CC0 704, CC1 706, CC2 708 in FIG. 7), and the CC (e.g., CC0 704 in FIG. 7) on which the feedback 614 is provided may be the CC (e.g., CC0 704 in FIG. 7) on which the DCI (e.g., 702 in FIG. 7) was received. In aspects, where the feedback 614 is SPS feedback (e.g., 712, 714, 716 in FIG. 7), the feedback 614 may be provided for each CC in the set of CCs (e.g., CC0 704, CC1 706, CC2 708 in FIG. 7).

Figure 12:
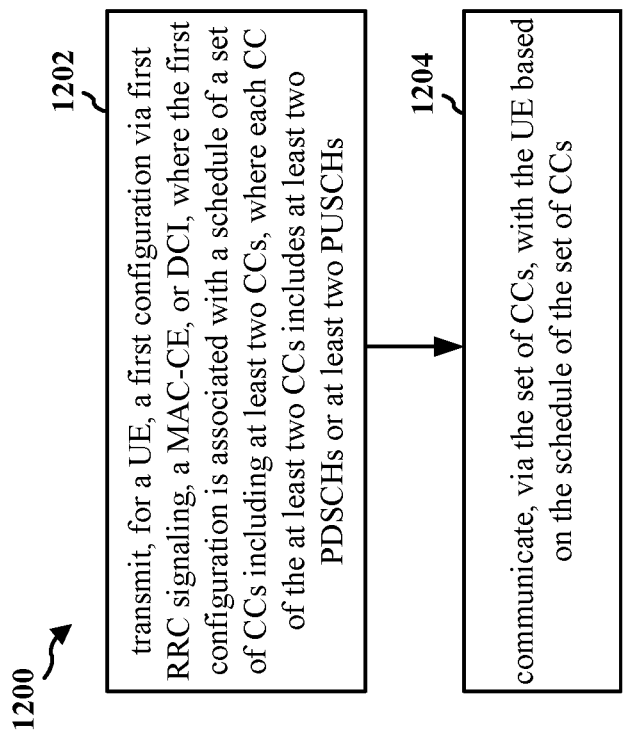
FIG. 12 is a flowchart of a method of wireless communication, in accordance with various aspects of the present disclosure.

FIG. 12 is a flowchart 1200 of a method of wireless communication, in various aspects. The method may be performed by a base station (e.g., the base station 102, 604; the network entity 1402). At 1202, the base station is configured to transmit, for a UE, a first configuration via first RRC signaling, a MAC-CE, or DCI, where the first configuration is associated with a schedule of a set of CCs including at least two CCs, where each CC of the at least two CCs includes at least two PDSCHs or at least two PUSCHs. In some aspects, 1202 may be performed by the component 199. For instance, referring to FIGS. 6, 7, 8, 9, the base station 604 is configured to transmit, for the UE 602, a scheduling parameter configuration 606. The scheduling parameter configuration 606 may include a scheduling field(s) (e.g., 710 in FIG. 7) for a set of CCs (e.g., 704, 706, 708 in FIG. 7), indices of scheduling field(s) (e.g., 710 in FIG. 7; 824, 826 in FIG. 8), and the scheduling field(s) (e.g., 710 in FIG. 7) may include configured values of scheduling parameters for TDRA, FDRA, MCS, and/or priority (e.g., 710 in FIG. 7). In aspects, the scheduling parameter configuration 606 may be transmitted by the base station 604 and received by the UE 602 via RRC signaling. In aspects, the base station 604 may be configured to transmit to the UE 602 a configuration 608. The configuration 608 may indicate a mapping between indices (e.g., 710 in FIG. 7; 824, 826 in FIG. 8) of the activated or deactivated CGs or SPSs on different BWPs of the CCs (904, 906 in FIG. 9). In aspects, a first index in a first CC may correspond to the mapping for a second index of a second CC (e.g., 710 in FIG. 7; 824, 826 in FIG. 8; 904, 906 in FIG. 9). In aspects, the configuration 608 may be transmitted by the base station and received by the UE 602 via RRC signaling. The base station 604 may also be configured to transmit to the UE 602 a configuration 610. The configuration 610 may be associated with a schedule of a set of CCs (e.g., at least two CCs in the set of CCs) (e.g., on 704, 706, 708 in FIG. 7; 802, 804, 806 in FIG. 8). In aspects, each CC of the set of CCs (e.g., on 704, 706, 708 in FIG. 7; 802, 804, 806 in FIG. 8) may include at least two PDSCHs or PUSCHs (e.g., SPS occasions on 704, 706, 708 in FIG. 7; 810, 812, 814 in FIG. 8). In aspects, the configuration 610 may be transmitted by the base station 604 and received by the UE 602 via RRC signaling, a MAC-CE, and/or DCI (e.g., 702 in FIG. 7; 808 in FIG. 8).

At 1204, the base station is also configured to communicate, via the set of CCs, with the UE based on the schedule of the set of CCs. In some aspects, 1204 may be performed by the component 199. For instance, with reference to 6, 7, 8, 9, the base station 604 may be configured to receive/transmit communications 612 (e.g., to communicate) with UE 602 via the CCs (e.g., on 704, 706, 708 in FIG. 7; 802, 804, 806 in FIG. 8), based on the scheduling parameter configuration 606, the configuration 608, and/or the configuration 610. That is, the base station 604 may communicate the communications 612 with the UE 602 based on the schedule (e.g., 710 in FIG. 7; 824, 826 in FIG. 8; 904, 906 in FIG. 9) of the set of CCs (e.g., on 704, 706, 708 in FIG. 7; 802, 804, 806 in FIG. 8).

Figure 13:
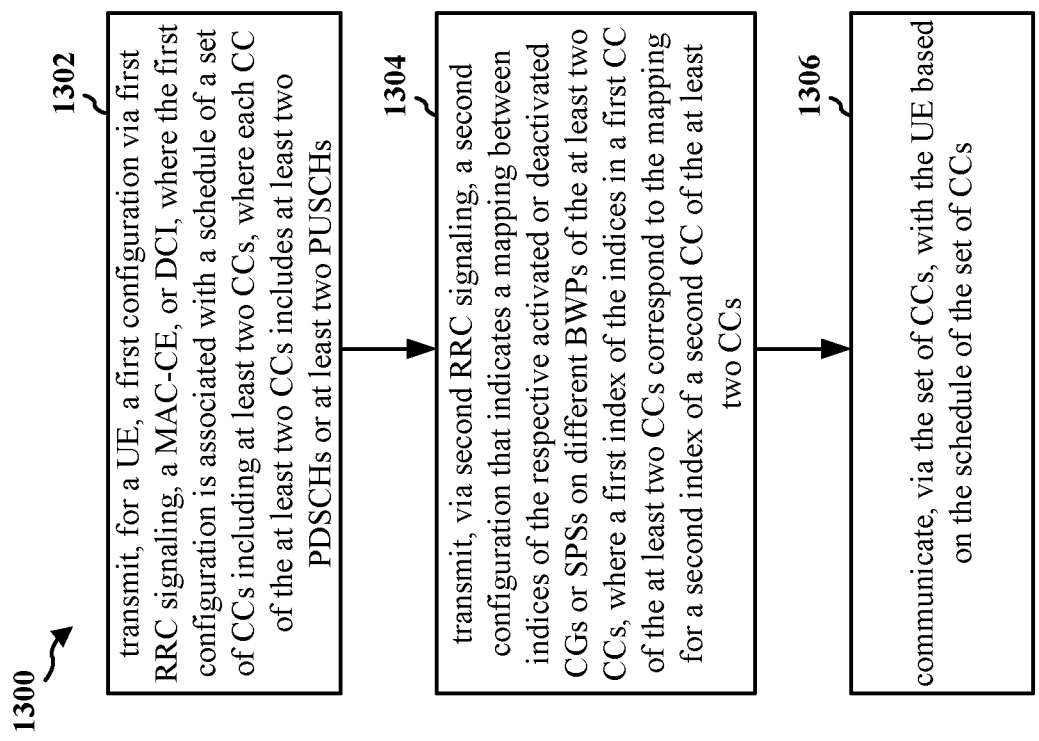
FIG. 13 is a flowchart of a method of wireless communication, in accordance with various aspects of the present disclosure.

FIG. 13 is a flowchart 1300 of a method of wireless communication, in various aspects. The method may be performed by a base station (e.g., the base station 102, 604; the network entity 1402. At 1302, the base station is configured to transmit, for a UE, a first configuration via first RRC signaling, a MAC-CE, or DCI, where the first configuration is associated with a schedule of a set of CCs including at least two CCs, where each CC of the at least two CCs includes at least two PDSCHs or at least two PUSCHs. In some aspects, 1302 may be performed by the component 199. For instance, referring to FIGS. 6, 7, 8, 9, the base station 604 is configured to transmit, for the UE 602, a scheduling parameter configuration 606. The scheduling parameter configuration 606 may include a scheduling field(s) (e.g., 710 in FIG. 7) for a set of CCs (e.g., 704, 706, 708 in FIG. 7), indices of scheduling field(s) (e.g., 710 in FIG. 7; 824, 826 in FIG. 8), and the scheduling field(s) (e.g., 710 in FIG. 7) may include configured values of scheduling parameters for TDRA, FDRA, MCS, and/or priority (e.g., 710 in FIG. 7). In aspects, the scheduling parameter configuration 606 may be transmitted by the base station 604 and received by the UE 602 via RRC signaling.

At 1304, the base station is also configured to transmit, via second RRC signaling, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. In some aspects, 1304 may be performed by the component 199. For instance, with reference to 6, 7, 8, 9, the base station 604 may be configured to the base station 604 may also be configured to transmit, form the UE 602, a configuration 608. The configuration 608 may indicate a mapping between indices (e.g., 710 in FIG. 7; 824, 826 in FIG. 8) of the activated or deactivated CGs or SPSs on different BWPs of the CCs (904, 906 in FIG. 9). In aspects, a first index in a first CC may correspond to the mapping for a second index of a second CC (e.g., 710 in FIG. 7; 824, 826 in FIG. 8; 904, 906 in FIG. 9). In aspects, the configuration 608 may be transmitted by the base station 604 and received by the UE 602 via RRC signaling. The base station 604 may also be configured to transmit to the UE 602 a configuration 610. The configuration 610 may be associated with a schedule of a set of CCs (e.g., at least two CCs in the set of CCs) (e.g., on 704, 706, 708 in FIG. 7; 802, 804, 806 in FIG. 8). In aspects, each CC of the set of CCs (e.g., on 704, 706, 708 in FIG. 7; 802, 804, 806 in FIG. 8) may include at least two PDSCHs or PUSCHs (e.g., SPS occasions on 704, 706, 708 in FIG. 7; 810, 812, 814 in FIG. 8). In aspects, the configuration 610 may be transmitted by the base station 604 and received by the UE 602 via RRC signaling, a MAC-CE, and/or DCI (e.g., 702 in FIG. 7; 808 in FIG. 8).

At 1306, the base station is also configured to communicate, via the set of CCs, with the UE based on the schedule of the set of CCs. In some aspects, 1306 may be performed by the component 199. For instance, with reference to 6, 7, 8, 9, the base station 604 may be configured to receive/transmit communications 612 (e.g., to communicate) with UE 602 via the CCs (e.g., on 704, 706, 708 in FIG. 7; 802, 804, 806 in FIG. 8), based on the scheduling parameter configuration 606, the configuration 608, and/or the configuration 610. That is, the base station 604 may communicate the communications 612 with the UE 602 based on the schedule (e.g., 710 in FIG. 7; 824, 826 in FIG. 8; 904, 906 in FIG. 9) of the set of CCs (e.g., on 704, 706, 708 in FIG. 7; 802, 804, 806 in FIG. 8).

Figure 14:
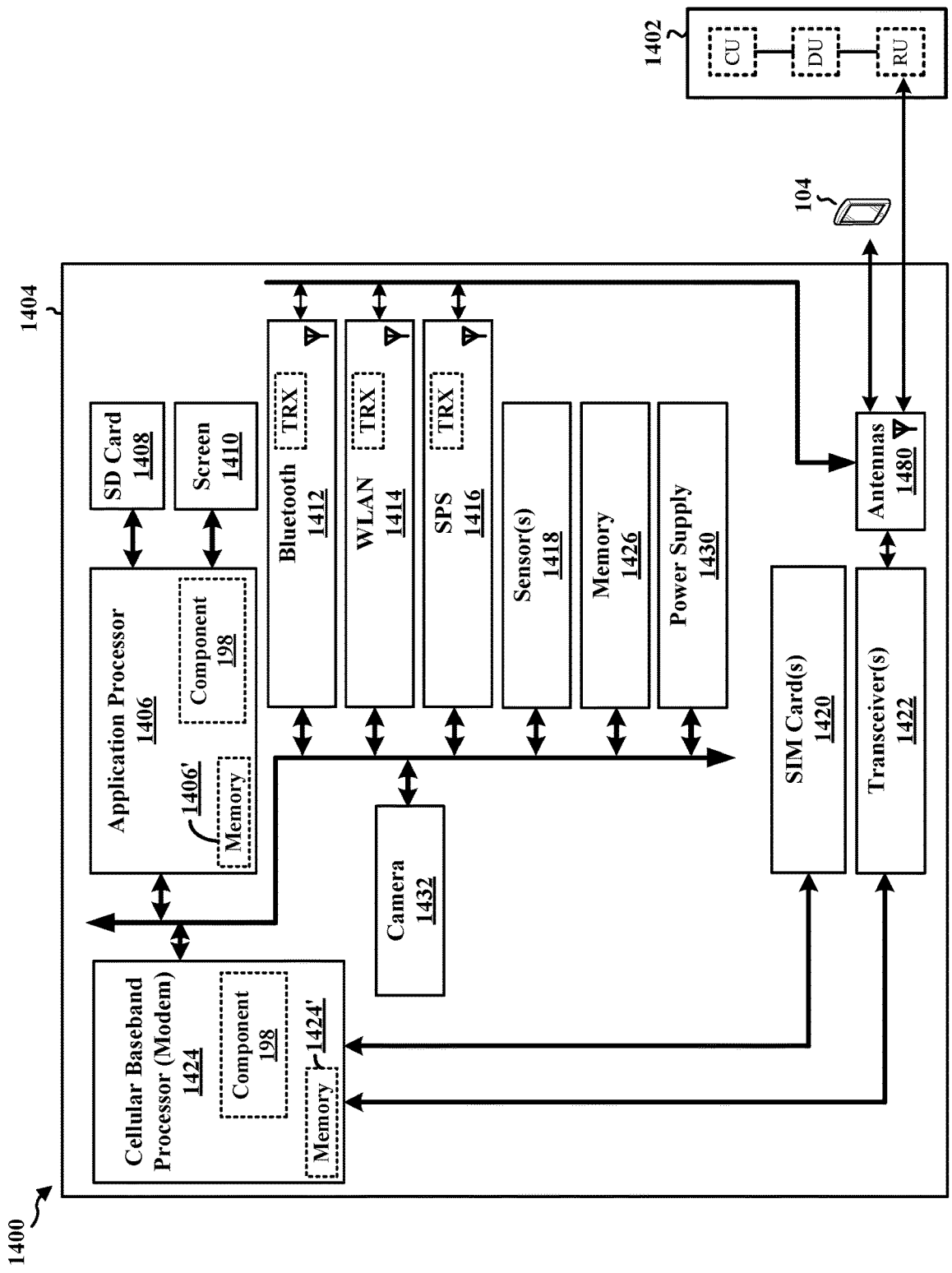
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to receive a configuration via first RRC signaling, a MAC-CE, or DCI, where the configuration is associated with a schedule of a set of CCs including at least two CCs, where each CC of the at least two CCs includes at least two PDSCHs or at least two PUSCHs. The component 198 is also configured to communicate, via the set of CCs, with a network node based on the schedule of the set of CCs. The component 198 may be configured to receive, via second RRC signaling prior to the configuration via the DCI, a scheduling parameter configuration of the one or more scheduling fields for the set of CCs, where the scheduling parameter configuration includes indices associated with the sets of scheduling fields, and where the sets of scheduling fields each include configured values of scheduling parameters associated with at least one of the TDRA field, the FDRA field, the MCS field, or the priority field. The component 198 may be configured to receive the configuration via the at least one transceiver and via first DCI and second DCI, where the first DCI is associated with the second indication that the additional DCI includes the differential information for the scheduling fields associated with the at least one CC in the set of CCs, and where the additional DCI is the second DCI and includes the differential information. The component 198 may be configured to receive, via fourth RRC signaling from the network node, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. The component 198 may be configured to transmit, via a CC of the at least two CCs and to the network node, HARQ-ACK feedback for the at least two PDSCHs, and where to receive the DCI the component 198 may be configured to receive the DCI via the CC of the at least two CCs. The component 198 may be configured to transmit, via each of the at least two CCs and to the network node, respective SPS feedback for the at least two PDSCHs. The component 198 may be configured to perform any of the aspects described in connection with FIGS. 10, 11, 12, 13 and/or performed by the UE in FIG. 6. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for receiving a first configuration via first RRC signaling, a MAC-CE, or DCI, where the first configuration is associated with a schedule of a set of CCs including at least two CCs, where each CC of the at least two CCs includes at least two PDSCHs or at least two PUSCHs. In the configuration, the apparatus 1404, and in particular the cellular baseband processor 1424 and/or the application processor 1406, includes means for communicating, via the set of CCs, with a network node based on the schedule of the set of CCs. In one configuration, the apparatus 1404, and in particular the cellular baseband processor 1424 and/or the application processor 1406, may include means for receiving, via second RRC signaling prior to receiving the first configuration via the DCI, a scheduling parameter configuration of the one or more scheduling fields for the set of CCs, where the scheduling parameter configuration includes indices associated with the sets of scheduling fields, and where the sets of scheduling fields each include configured values of scheduling parameters associated with at least one of the TDRA field, the FDRA field, the MCS field, or the priority field. In one configuration, the apparatus 1404, and in particular the cellular baseband processor 1424 and/or the application processor 1406, may include means for receiving the first configuration via first DCI and second DCI, where the first DCI is associated with the second indication that the additional DCI includes the differential information for the scheduling fields associated with the at least one CC in the set of CCs, and where the additional DCI is the second DCI and includes the differential information. In one configuration, the apparatus 1404, and in particular the cellular baseband processor 1424 and/or the application processor 1406, may include means for receiving, via fourth RRC signaling from the network node, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. In one configuration, the apparatus 1404, and in particular the cellular baseband processor 1424 and/or the application processor 1406, may include means for transmitting, via a CC of the at least two CCs and to the network node, HARQ-ACK feedback for the at least two PDSCHs, where the DCI is received via the CC of the at least two CCs. In one configuration, the apparatus 1404, and in particular the cellular baseband processor 1424 and/or the application processor 1406, may include means for transmitting, via each of the at least two CCs and to the network node, respective SPS feedback for the at least two PDSCHs. In one configuration, the apparatus 1404, and in particular the cellular baseband processor 1424 and/or the application processor 1406, may include means for performing any of the aspects described in connection with FIGS. 10, 11, 12, 13 and/or performed by the UE in FIG. 6. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
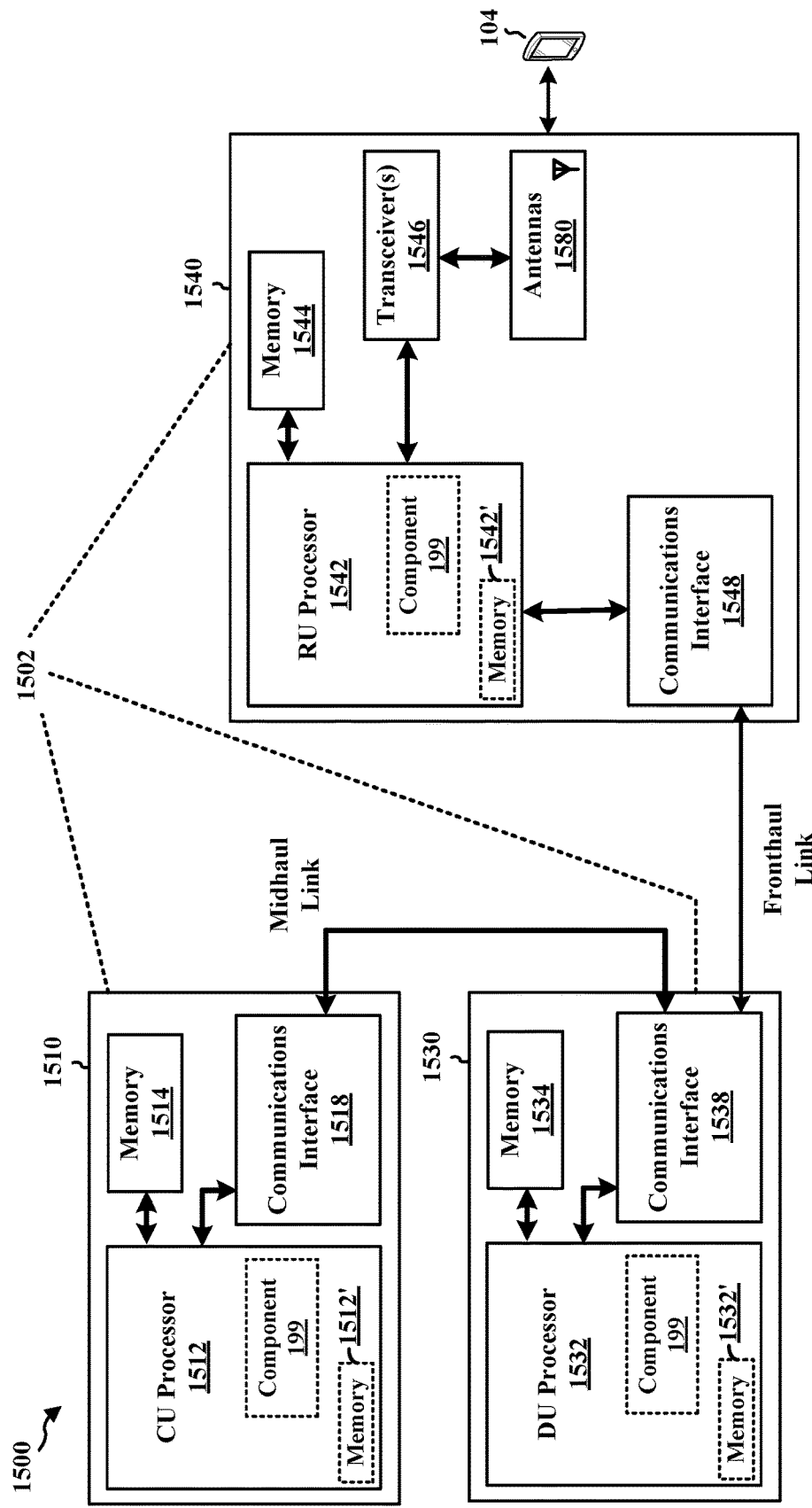
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, for a UE, a configuration via first RRC signaling, a MAC-CE, or DCI, where the configuration is associated with a schedule of a set of CCs including at least two CCs, where each CC of the at least two CCs includes at least two PDSCHs or at least two PUSCHs. The component 199 is also configured to communicate, via the set of CCs, with the UE based on the schedule of the set of CCs. The component 199 may also be configured to transmit the configuration via first DCI and second DCI, where the first DCI is associated with the second indication that the additional DCI includes differential information for the scheduling fields associated with at least one CC in the set of CCs, and where the additional DCI is the second DCI and includes the differential information. The component 199 may also be configured to transmit, via second RRC signaling, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. The component 199 may be further configured to perform any of the aspects described in connection with FIGS. 10, 11, 12, 13 and/or performed by the network entity/node (e.g., a gNB; a base station) in FIG. 6. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for transmitting, for a UE, a first configuration via first RRC signaling, a MAC-CE, or DCI, where the first configuration is associated with a schedule of a set of CCs including at least two CCs, where each CC of the at least two CCs includes at least two PDSCHs or at least two PUSCHs. In the configuration, the network entity 1502 includes means for communicating, via the set of CCs, with the UE based on the schedule of the set of CCs. In one configuration, the network entity 1502 may include means for transmitting the first configuration via first DCI and second DCI, where the first DCI is associated with the second indication that the additional DCI includes differential information for the scheduling fields associated with at least one CC in the set of CCs, and where the additional DCI is the second DCI and includes the differential information. In one configuration, the network entity 1502 may include means for transmitting, via second RRC signaling to the UE, a second configuration that indicates a mapping between indices of the respective activated or deactivated CGs or SPSs on different BWPs of the at least two CCs, where a first index of the indices in a first CC of the at least two CCs correspond to the mapping for a second index of a second CC of the at least two CCs. In one configuration, the network entity 1502 may include means for performing any of the aspects described in connection with FIGS. 10, 11, 12, 13 and/or performed by the network entity (e.g., network node, base station, a component of a base station) in FIG. 6. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Some wireless communications may include traffic with large payloads and short deadlines that benefits from low latency. As an example, extended reality (XR) traffic may have short timeframes for exchange, as well as high data-rate flows such as video. Existing wireless networks lack the ability to schedule multiple PUSCHs/PDSCHs (PXSCHs) per a single scheduling DCI and provide a single PUSCH/PDSCH scheduling per single scheduling DCI. Additionally, scheduling of a single SPS/CG by a single DCI is supported by existing networks, but not multiple SPS/CG opportunities via a single DCI. Aspects presented herein provide improvements via a multi-slot PXSCH scheduling with a single DCI and multi-SPS/CG at a time over multiple carriers via a single DCI, and also improve communication delay for sensitive traffic and power usage at the UE- and the network-side. Aspects herein provide for large video frame data size, e.g., in XR, which utilize more than one PUSCHs to be transmitted in each video frame period, for instance, via a multi-PUSCH scheduling DCI to provide the resource allocation information for these PUSCHs. Such aspects may be based on multiple PUSCHs activated for the same CG occasion and/or on multiple CGs jointly activated by the same DCI. Aspects also enable utilization for increased availability of scattered spectrum bands or wider bandwidth spectrum, providing for simultaneous scheduling of multiple cells. Still further, to reduce the control overhead, aspects enhance single-cell scheduling to multi-cell PUSCH/PDSCH scheduling with a single scheduling DCI, while balancing between overhead savings and scheduling restriction. That is, aspects presented herein provide for multiple PUSCH opportunities around the same CG occasion, as well as joint activation of CGs by the same DCI, and for improvements in flexibility and spectral/power efficiency on scheduling data over multiple cells, including without limitation, intra-band cells and inter-band cells. Aspects include implementing configurations, at a UE, associated with a schedule of a set of CCs, where each CC of the set may include at least two PDSCHs or PUSCHs, and communicating, via the set of CCs, between a UE and a network node based on the schedule of the set of CCs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communications at a user equipment (UE), including: receiving a first configuration via first radio resource control (RRC) signaling, a medium access control (MAC) control element (MAC-CE), or downlink control information (DCI), where the first configuration is associated with a schedule of a set of component carriers (CCs) including at least two CCs, where each CC of the at least two CCs includes at least two physical downlink shared channels (PDSCHs) or at least two physical uplink shared channels (PUSCHs), and communicating, via the set of CCs, with a network node based on the schedule of the set of CCs.

Aspect 2 is the method of aspect 1, where the DCI includes a set of DCI fields, where each DCI field in the set of DCI fields corresponds to a CC identifier, respectively, for each CC of the at least two CCs, and is associated with a configuration value that corresponds to the schedule of the set of CCs.

Aspect 3 is the method of aspect 2, where each configuration value is an index value associated with sets of scheduling fields, where each set of the sets of scheduling fields includes one or more scheduling fields that each include at least one of a time domain resource assignment (TDRA) field, a frequency domain resource assignment (FDRA) field, a modulation coding scheme (MCS) field, or a priority field, and where each of the one or more scheduling fields includes a corresponding scheduling value.

Aspect 4 is the method of any of aspects 1 to 3, further including receiving, via second RRC signaling prior to receiving the first configuration via the DCI, a scheduling parameter configuration of the one or more scheduling fields for the set of CCs, where the scheduling parameter configuration includes indices associated with the sets of scheduling fields, and where the sets of scheduling fields each include configured values of scheduling parameters associated with at least one of the TDRA field, the FDRA field, the MCS field, or the priority field.

Aspect 5 is the method of any of aspects 1 to 4, where the first configuration includes at least one of a first indication of scheduling fields associated with the DCI being applicable to each CC the set of CCs or a second indication that additional DCI includes differential information for the scheduling fields associated with at least one CC in the set of CCs.

Aspect 6 is the method of aspect 5, where receiving the first configuration via the DCI includes receiving the first configuration via first DCI and second DCI, where the first DCI is associated with the second indication that the additional DCI includes the differential information for the scheduling fields associated with the at least one CC in the set of CCs, and where the additional DCI is the second DCI and includes the differential information.

Aspect 7 is the aspect of aspect 6, where the differential information is associated with at least one a time domain resource assignment (TDRA) field, a frequency domain resource assignment (FDRA) field, a modulation coding scheme (MCS) field, or a priority field across the set of CCs, and where the second DCI has a configurable size associated with the differential information, or where the first DCI and the second DCI correspond to a same CC.

Aspect 8 is the method of any of aspects 6 and 7, where a search space of the first DCI is linked to the second DCI, where the search space of the first DCI schedules the at least two PDSCHs across the at least two CCs.

Aspect 9 is the method of any of aspects 1 to 8, where the DCI is repeated according to a repetition factor, where the repetition factor corresponds to a linked physical downlink control channel (PDCCH) repetition or to linked DCIs across the set of CCs, and where the repetition factor is indicated to the UE via third RRC signaling or a medium access control (MAC) control element (MAC-CE).

Aspect 10 is the method of any of aspects 1 to 9, where each CC of the at least two CCs includes the at least two PDSCHs, and where the DCI includes a hybrid automatic repeat request (HARM) process number field that is associated with a respective configuration for each of the CCs in the set of CCs.

Aspect 11 is the method of aspect 1, where each CC of the at least two CCs includes the at least two PDSCHs, and where the DCI indicates activating one or more of: at least one of a configured grant (CG) or semi-persistent scheduling (SPS) for the at least two PDSCHs, or at least two CGs or at least two SPSs for a PDSCH of the at least two PDSCHs.

Aspect 12 is the method of aspect 11, where at least one transmission parameter associated with at least one of a time domain resource assignment (TDRA), a frequency domain resource assignment (FDRA), a number of ports, or a K1 value is different or identical across two or more CGs or SPSs for the at least two PDSCHs, where the at least one transmission parameter is one or more of a modulation coding scheme (MCS), a resource block (RB) allocation, or antenna ports of the at least two SPSs.

Aspect 13 is the method of aspect 12, where at least one of time domain resource assignments (TDRAs), frequency domain resource assignments (FDRAs), numbers of ports, or K1 values are jointly encoded in a modulation coding scheme (MCS) field for the at least two CCs, and where the TDRAs represent an offset between one of the at least two CCs, the FDRAs represent FDRA fields for the at least two CCs, the numbers of ports represent different or identical ports for the at least two CCs, and the K1 values are different for the at least two CCs and map to a same resource.

Aspect 14 is the method of aspect 13, where a periodicity of the SPS or the at least two SPSs is updated across the at least two CCs by the DCI.

Aspect 15 is the method of any of aspects 11 to 14, where the DCI includes separate activation fields or deactivation fields for activation or deactivation of respective CGs or SPSs of a PUSCH or a PDSCH on an occasion of each of the respective CGs or SPSs over the at least two CCs.

Aspect 16 is the method of aspect 15, where the method further includes receiving, via fourth RRC signaling from the network node, a second configuration that indicates a mapping between indices of the respective activated or deactivated CGs or SPSs on different bandwidth parts (BWPs) of the at least two CCs, where a first index of the indices in a first CC of the at least two CCs correspond to the mapping for a second index of a second CC of the at least two CCs.

Aspect 17 is the method of any of aspects 11 to 16, where the at least one of the CG or SPS, or the at least two CGs or at least two SPSs, include a respective first set and a respective second set, where the DCI indicates activating the respective first set, and where the DCI further indicates deactivating, via a switching parameter associated with a timer, the second set when the DCI indicates activating the respective first set.

Aspect 18 is the method of aspect 15, where the timer corresponds to at least one value for the at least two CCs based on a timing configuration via fifth RRC signaling, or where the timer corresponds to SPS switching information in the DCI.

Aspect 19 is the method of any of aspects 11 to 18, where at least one of an activation, a reactivation, or a release for the schedule is indicated by the DCI, where the DCI is repeated as one or more instances across time for a CC in the set of CCs or the DCI is repeated across the at least two CCs, and where the one or more instances of the DCI that are repeated are linked based on a search space, an aggregation level (AL), or a DCI configuration.

Aspect 20 is the method of any of aspects 11 to 19, where each CC of the at least two CCs includes the at least two PDSCHs, and where the method further includes at least one of transmitting, via at least one transceiver of the network node and via a CC of the at least two CCs and to the network node, hybrid automatic repeat request (HARM) acknowledgement (HARQ-ACK) feedback for the at least two PDSCHs, where the DCI is received via the CC of the at least two CCs; or transmitting, via each of the at least two CCs and to the network node, respective semi-persistent scheduling (SPS) feedback for the at least two PDSCHs.

Aspect 21 is a method of wireless communications at a network node, including transmitting, for a user equipment (UE), a first configuration via first radio resource control (RRC) signaling, a medium access control (MAC) control element (MAC-CE), or downlink control information (DCI), where the first configuration is associated with a schedule of a set of component carriers (CCs) including at least two CCs, where each CC of the at least two CCs includes at least two physical downlink shared channels (PDSCHs) or at least two physical uplink shared channels (PUSCHs), and communicating, via the set of CCs, with the UE based on the schedule of the set of CCs.

Aspect 22 is the method of aspect 21, where the DCI includes a set of DCI fields, where each DCI field in the set of DCI fields corresponds to a CC identifier, respectively, for each CC of the at least two CCs, and is associated with a configuration value that corresponds to the schedule of the set of CCs.

Aspect 23 is the method of aspect 22, where each configuration value is an index value associated with sets of scheduling fields, where each set of the sets of scheduling fields includes one or more scheduling fields that each include at least one of a time domain resource assignment (TDRA) field, a frequency domain resource assignment (FDRA) field, a modulation coding scheme (MCS) field, or a priority field, and where each of the one or more scheduling fields includes a corresponding scheduling value.

Aspect 24 is the method of any of aspects 21 to 23, where the first configuration includes at least one of a first indication of scheduling fields associated with the DCI being applicable to each CC the set of CCs or a second indication that additional DCI includes differential information for the scheduling fields associated with at least one CC in the set of CCs.

Aspect 25 is the method of aspect 24, where transmitting the first configuration via the DCI includes transmitting the first configuration via first DCI and second DCI, where the first DCI is associated with the second indication that the additional DCI includes differential information for the scheduling fields associated with at least one CC in the set of CCs, and where the additional DCI is the second DCI and includes the differential information.

Aspect 26 is the method of any of aspects 21 to 25, where each CC of the at least two CCs includes the at least two PDSCHs, and where the DCI includes a hybrid automatic repeat request (HARM) process number field that is associated with a respective configuration for each of the CCs in the set of CCs.

Aspect 27 is the method of aspect 21, where each CC of the at least two CCs includes the at least two PDSCHs, and where the DCI indicates activating one or more of: at least one of a configured grant (CG) or semi-persistent scheduling (SPS) for the at least two PDSCHs, or at least two CGs or at least two SPSs for a PDSCH of the at least two PDSCHs.

Aspect 28 is the method of aspect 27, where the DCI includes separate activation fields or deactivation fields for activation or deactivation of respective CGs or SPSs of a PUSCH or a PDSCH on an occasion of each of the respective CGs or SPSs over the at least two CCs, and where the method further includes transmitting, via second RRC signaling to the UE and via at least one transceiver of the network node, a second configuration that indicates a mapping between indices of the respective activated or deactivated CGs or SPSs on different bandwidth parts (BWPs) of the at least two CCs, where a first index of the indices in a first CC of the at least two CCs correspond to the mapping for a second index of a second CC of the at least two CCs.

Aspect 29 is an apparatus for wireless communication at a UE. The apparatus includes a memory; and at least one processor coupled to the memory and, based at least in part on information stored in the memory, the at least one processor is configured to implement any of aspects 1 to 20.

Aspect 30 is the apparatus of aspect 29, further including at least one of a transceiver or an antenna coupled to the at least one processor.

Aspect 31 is an apparatus for wireless communication including means for implementing any of aspects 1 to 20.

Aspect 32 is a computer-readable medium (e.g., a non-transitory computer-readable medium) storing computer executable code, the code when executed by at least one processor causes the at least one processor to implement any of aspects 1 to 20.

Aspect 33 is an apparatus for wireless communication at a network node. The apparatus includes a memory; and at least one processor coupled to the memory and, based at least in part on information stored in the memory, the at least one processor is configured to implement any of aspects 21 to 28.

Aspect 34 is the apparatus of aspect 33, further including at least one of a transceiver or an antenna coupled to the at least one processor.

Aspect 35 is an apparatus for wireless communication including means for implementing any of aspects 21 to 28.

Aspect 36 is a computer-readable medium (e.g., a non-transitory computer-readable medium) storing computer executable code, the code when executed by at least one processor causes the at least one processor to implement any of aspects 21 to 28.

What is claimed is:

1. An apparatus for wireless communication at a user equipment (UE), comprising:
a memory; and
at least one processor coupled to the memory and, based at least in part on information stored in the memory, further comprising at least one transceiver coupled to the at least one processor, the at least one processor is configured to:
receive a configuration via first radio resource control (RRC) signaling, a medium access control (MAC) control element (MAC-CE), or downlink control information (DCI), wherein the configuration is associated with a schedule of a set of component carriers (CCs) including at least two CCs, wherein each CC of the at least two CCs includes at least two physical downlink shared channels (PDSCHs) or at least two physical uplink shared channels (PUSCHs); and
communicate, via the set of CCs, with a network node based on the schedule of the set of CCs;
wherein to receive the configuration via DCI, the at least one processor is configured to:
receive the configuration via the at least one transceiver and via a first DCI and a second DCI, wherein the first DCI is associated with an indication that indicates additional DCI includes differential information for scheduling fields associated with at least one CC in the set of CCs and the additional DCI includes the differential information for the scheduling fields associated with the at least one CC in the set of CCs, and wherein the additional DCI is the second DCI and includes the differential information.

2. The apparatus of claim 1, wherein the differential information is associated with at least one a time domain resource assignment (TDRA) field, a frequency domain resource assignment (FDRA) field, a modulation coding scheme (MCS) field, or a priority field across the set of CCs,
wherein the second DCI has a configurable size associated with the differential information, or
wherein the first DCI and the second DCI correspond to a same CC.

3. The apparatus of claim 1, wherein a search space of the first DCI is linked to the second DCI, wherein the search space of the first DCI schedules the at least two PDSCHs across the at least two CCs.

4. An apparatus for wireless communication at a network node, comprising:
a memory; and
at least one processor coupled to the memory and, based at least in part on information stored in the memory, further comprising at least one transceiver coupled to the at least one processor,
the at least one processor is configured to:
transmit, for a user equipment (UE), a configuration via first radio resource control (RRC) signaling, a medium access control (MAC) control element (MAC-CE), or downlink control information (DCI), wherein the configuration is associated with a schedule of a set of component carriers (CCs) including at least two CCs, wherein each CC of the at least two CCs includes at least two physical downlink shared channels (PDSCHs) or at least two physical uplink shared channels (PUSCHs); and
communicate, via the set of CCs, with the UE based on the schedule of the set of CCs,
wherein to transmit the configuration via DCI, the at least one processor is configured to:
transmit the configuration via the at least one transceiver and via a first DCI and a second DCI, wherein the first DCI is associated with an indication that indicates additional DCI includes differential information for scheduling fields associated with at least one CC in the set of CCs and the additional DCI includes the differential information for the scheduling fields associated with the at least one CC in the set of CCs, and wherein the additional DCI is the second DCI and includes the differential information.

5. A method of wireless communications at a user equipment (UE), comprising:
receiving a configuration via first radio resource control (RRC) signaling, a medium access control (MAC) control element (MAC-CE), or downlink control information (DCI), wherein the configuration is associated with a schedule of a set of component carriers (CCs) including at least two CCs, wherein each CC of the at least two CCs includes at least two physical downlink shared channels (PDSCHs) or at least two physical uplink shared channels (PUSCHs); and
communicating, via the set of CCs, with a network node based on the schedule of the set of CCs,
wherein receiving the configuration via DCI comprises:
receiving the configuration via a first DCI and a second DCI, wherein the first DCI is associated with an indication that indicates additional DCI includes differential information for scheduling fields associated with at least one CC in the set of CCs and the additional DCI includes the differential information for the scheduling fields associated with the at least one CC in the set of CCs, and wherein the additional DCI is the second DCI and includes the differential information.

6. The apparatus of claim 1, the configuration being received via the first DCI and the second DCI.

7. The apparatus of claim 2, the configuration being transmitted via the first DCI and the second DCI.

8. The apparatus of claim 3, the configuration being transmitted via the first DCI and the second DCI.

9. The apparatus of claim 4, the configuration being transmitted via the first DCI and the second DCI.

10. The method of claim 5, the configuration being transmitted via the first DCI and the second DCI.

* * * * *